United States Patent [19]
Levine

[11] Patent Number: 6,076,121
[45] Date of Patent: Jun. 13, 2000

[54] METHOD OF NETWORK ADDRESSING AND TRANSLATION

[76] Inventor: Richard C. Levine, 7950 Woodstone, Dallas, Tex. 75248

[21] Appl. No.: 09/039,004

[22] Filed: Mar. 13, 1998

[51] Int. Cl.[7] .................................................. H04L 12/00
[52] U.S. Cl. .......................... 710/62; 709/220; 709/222; 710/65
[58] Field of Search .................................... 379/207, 211, 379/219, 220, 229, 230, 93.24, 100.08; 395/200.53; 709/220, 222; 710/62, 65

[56] References Cited

U.S. PATENT DOCUMENTS

| | | | |
|---|---|---|---|
| 4,313,035 | 1/1982 | Jordan et al. | 179/18 BE |
| 4,648,061 | 3/1987 | Foster | 264/900 |
| 4,649,563 | 3/1987 | Riskin | 379/97 |
| 4,674,115 | 6/1987 | Kaleita et al. | 379/201 |
| 4,748,661 | 5/1988 | Edelstein et al. | 379/289 |
| 4,752,951 | 6/1988 | Konneker | 379/211 |
| 4,757,267 | 7/1988 | Riskin | 379/113 |
| 4,827,500 | 5/1989 | Binkerd et al. | 379/88 |
| 4,841,526 | 6/1989 | Wilson et al. | 371/32 |
| 4,932,042 | 6/1990 | Baral et al. | 379/67 |
| 5,018,191 | 5/1991 | Catron et al. | 379/100 |
| 5,033,079 | 7/1991 | Catron et al. | 379/100 |
| 5,077,732 | 12/1991 | Fischer et al. | 370/85.4 |
| 5,099,511 | 3/1992 | Matsumoto | 379/198 |
| 5,136,636 | 8/1992 | Wegrzynowicz | 379/207 |
| 5,168,517 | 12/1992 | Waldman | 379/67 |
| 5,182,766 | 1/1993 | Garland | 379/216 |
| 5,187,735 | 2/1993 | Herrero Garcia et al. | 379/88 |
| 5,193,110 | 3/1993 | Jones et al. | 379/94 |
| 5,233,648 | 8/1993 | Nakamura | 379/233 |
| 5,239,577 | 8/1993 | Bates et al. | 379/201 |
| 5,311,586 | 5/1994 | Bogart et al. | 379/221 |
| 5,327,489 | 7/1994 | Anderson et al. | 379/207 |
| 5,329,589 | 7/1994 | Fraser et al. | 379/91 |
| 5,465,295 | 11/1995 | Furman | 379/211 |
| 5,598,458 | 1/1997 | Bales et al. | 379/58 |
| 5,621,894 | 4/1997 | Menezes et al. | 395/200.12 |

FOREIGN PATENT DOCUMENTS

| | | | |
|---|---|---|---|
| 0 531 268 A2 | 3/1993 | European Pat. Off. | H04Q 3/62 |
| WO 91/11874 | 8/1991 | WIPO | H04M 11/00 |

OTHER PUBLICATIONS

Bellcore, "ISDN Primary Rate Interface Call Control Switching and Signaling Generic Requirements for Class II Equipment," Technical Reference TR–NWT–001268, Issue 1, *BellCore Communications Research*, Dec., 1991, 16 pages.

G. Dicenet, Research Group, CNET, "Design and Prospects for the ISDN," *Artech House, Boston and London*, 14 pages, 1987.

*Primary Examiner*—Thomas C. Lee
*Assistant Examiner*—Bing Bui
*Attorney, Agent, or Firm*—Baker Botts L.L.P.

[57] ABSTRACT

The present invention provides a system and method of addressing and translating addresses in a network, such as a telecommunications, cellular or transportation network. The system and method in a telephone network assign a directory number to each user, and functional property code(s) to each device a user employs. The same directory number is then used to reach the user, whereby the system will automatically use the functional property code of each device to reach the user's voice line, cellular line, fax line, data line or other telephone network device. The system and method apply to transportation networks such as airlines, busses, rail, and shipping, to pipeline networks such as the oil industry, delivery networks such as postal services, and to other networks in which symbolic addresses are used to designate a source and a destination of traffic.

128 Claims, 2 Drawing Sheets

METHOD OF NETWORK ADDRESSING AND TRANSLATION

BACKGROUND OF THE INVENTION

1. Technical Field of the Invention

The present invention relates to networks, and more specifically, to a system and method of symbolic addressing and translation in telephone, cellular, data communication, or other networks.

2. Description of the Related Art

A network is a collection of points (called origin points, transit points or destination points collectively called nodes) and links between these points. The network transfers items of material substance or information, which are collectively referred to as traffic, from origin points (OP) through the links to a node where the item being transferred is routed to another link for transport to a destination point (DP).

An origin point is where an item enters a network. A destination point is the final place where an item is to be delivered within the network. In most networks, each origin point can also function as destination point, and likewise, each destination point can also function as an origin point. Usually a points status depends only on the use of the point. Commonly identifiable points include telephones, cellular phones, data terminals and physical street addresses. Links are paths of travel. Commonly identifiable links include wires, radio waves, guided and/or unguided electromagnetic waves, laser beams, roads, pipelines, corridors, vehicle delivery routes, or other transmission paths, and may include antennas or other devices to facilitate the reception or transmission of traffic. Network node transit points are located at link intersections. Transit points accept incoming items (for example data or voice signals in a telephone network), and based on routing information which is logically associated with the item, the transit point routes the items to a link which will then carry the item to another transit point or to a predetermined destination point. Transit points may include telephone switching equipment, an Internet server, airports, rail track switches, depots, and the like.

The routing information which is logically associated with an item at a node commonly uses a symbolic address (SA), otherwise known as a symbolic network address. The SA may be logically associated with a physical item, a separate channel, or a logically different network such as exchanging telephone numbers in Internet databases. An SA may designate the point of origin of an item and/or the destination point of an item. Examples of distinct explicit SAs include "telephone" directory numbers (DNs) and residential or business street addresses. Multiple devices may be used to complete the transmission of an item. For example, the telephone line designated by a particular telephone number may terminate to a telephone, cellular phone, fax machine, or computer. In the prior art, there has been no practical network method to indicate or control the functional properties or protocol of a terminal point, and to thereby preferably route traffic between compatible origin and destination points. For example, a user of a voice telephone cannot usefully communicate with a telefax machine.

At a transit point, switching algorithms are utilized to direct the flow of traffic from an origin point to a destination point using an item's SA. The most common algorithm uses tables, called translation tables (also called lists, arrays, or data bases), which comprise predetermined lists of matched inputs (typically destination point SAs) with corresponding possible outputs such as specific links. Various tables may be selected based on factors such as date, time of day, weather, or any variety of conditions. Ideally, the transit point will use the destination SA to select an optimal path of travel for an arriving item. The methods of determining the method of item travel are dependent upon the use of a distinct explicit SA for each physical point in the network.

Prior Art Example 1, A Mail or Parcel Delivery System

A mail or parcel system is a simple network. Each resident has a resident address and each business has a corresponding business address, where an address serves as an origin point (the return address) or destination point (the location the item is addressed to). The links are the roads and other transportation routes that make the delivery of the mailed items possible. The post offices and parcel handling offices serve as transit point nodes—sorting mail or parcels and directing it to appropriate links for delivery to designated DPs.

In a typical mail network operation, a user addresses an item with an explicit address indicating where the item is to be sent (a symbolic DP) and the user's own return address (a symbolic OP), then places the item in a mailbox or parcel drop box (a physical OP) and effectively consigns the item to the transportation network. The postal or parcel service will then carry the item by road, rail, air or water (all of which are links) to a post office or parcel handling office transit points. At such an office, the symbolic DP is read. Provided the DP is legible and meets certain criteria of the network, the office sorts the item according to the link or series of links which optimize the delivery of the item. Further sorting may occur at other network nodes as well. The item is then transported across the selected links and is delivered to the DP of the addressee.

Passenger and freight transportation networks such as airlines, bus lines, rail and water vessel lines also operate in a similar manner, and internal networks such as luggage handling networks of conveyor belts in airports, item picking operations for packing an order in a warehouse, or pneumatic tube conveyors used in offices are further examples of a transportation network which uses symbolic DP addressing. In some cases, the DP (and OP) information is associated with the item in transportation networks by means of a label or other media such as bar coding, magnetic stripe coding, attached/embedded radio transponder, or other means which can be read or sensed by human workers or appropriate equipment directly from the item itself. In other cases, a logically separate or even physically separate data communication network is established to convey the DP (and OP) information associated with each item, for control of the sorting and switching.

Prior Art Example 2, A Data Communication Network

The Internet and associated electronic mail (e-mail) networks are examples of a data communication network. The originator of an e-mail message can type a message, and can also attach data files of various types to said message, and then can consign said message with its attachments to the e-mail network together with a header which comprises the DP SA (for example: john.smith@bigcompany.com), and also the OP SA. Internet users may also establish a network route to a so-called hyper-text telecommunications protocol server by use of a DP SA of the form http://www.interestingstutf.com. In an Internet network, items consisting of packets of digital data travel through links to nodes, where they are sorted based on the DP SA, and then sent on their way via an outgoing link selected to optimize the delivery of the item. In a two-way communication, other items or packets of data traffic go from the so-called destination point to the so-called origination point. In many networks such as broadcasting systems, cable television distribution, electric power distribution networks, water and gas distribution pipeline systems, Internet http operations, and the like, most or all of the traffic flows from the so-called destination point to the so-called origin point.

Many networks including these also have the structural property that some nodes are used for both transit and also for origination and destination. Many networks having a so-called "multi-drop" topology such as local area networks (LANs) for data communication, and the aforementioned gas, water, and electric networks have this topological structure. Internet networks may utilize some links from other networks, such as the public switched telephone network (PSTN), to form part or all of their physical link structure, although the points and nodes are generally made up of distinct equipment from said other networks such as the PSTN.

Prior Art Example 3, A Telephone Network

A PSTN (or a non-public telephone network as well) provides another example of a prior art network. A PSTN is comprised of telephones, fax machines, computers, cellular telephones and other devices which have assigned SAs which can be used as origination points or destination points. In a PSTN, each SA (telephone number) corresponds to a single link dedicated to that SA called a "subscriber line" (SL). PSTNs use wire lines or electromagnetic waves as links, and possess switching equipment at a central offices (CO) or various transit switching offices. In a telephone network, the switching equipment is the network node.

The PSTN industry has voluntarily agreed to use the standard control message protocol called common channel signaling system number 7, (S7). To simplify the discussion, and because S7 is well known and widely used in the PSTN art, S7 specifics are discussed only where necessary. The present invention is not limited to S7-related embodiments.

Each subscriber line or channel in a switch is assigned an internal line appearance number (ILAN) by the appropriate telephone switching administration. The ILAN is used in the internal call processing of a switch to identify a line for purposes of wiring repairs, to identify which line is originating a call, to route a connection within the switch to a particular destination, and the like. In effect, the internal ILAN numbering system of a switch can uniquely relate the internal number assigned for each subscriber line in use to the physical rack, shelf, and printed wiring card where the line appears.

In a cellular or personal communication system (PCS) system, other internal data elements, often proprietary, play the same role as the ILAN does in a wired telephone switch. However, due to handoffs, the ILAN-equivalent in a cellular or PCS system changes from time to time as the telephone involved in a conversation moves from cell to cell and is consequently in radio communication with different base radio channels in different cells. Due to their design, a cellular or PCS switch can maintain a connection despite the timely changes in ILAN, and the changes in internal ILAN in such a situation do not prevent the operation of the present invention.

Telephone directory numbers (DNs) are not the same as ILANs in a modern electronic telephone switch. DNs and ILANs are related to each other by means of translation tables. Then, as subscriber lines are disconnected and new subscriber lines are added to a PSTN, the telephone switching administrator needs only to assign the new subscriber line to an existing ILAN through software programming which modifies the data in said translation tables, rather than requiring a hardware or wiring change.

When the person originating a telephone call lifts a telephone handset A and dials digits, the central office switching equipment receives an internal signal which is identified with the ILAN of the OP line A. When an incoming call comes from a different OP B toward this DP A, its DP is identified as the DN of line A. When the DN is thus given, the translation table used is organized to translate DN into ILAN, so the proper destination line can be connected for such an incoming call When the ILAN is given, as in the case of the origination from line A, a distinct translation table organized to translate ILAN into DN is used, so the proper DN can be used for calling line ID services and so the call will be billed to the proper origination line. Links between telephone switches are called trunks. In most installations, a telephone switch has a plurality of trunks, each trunk or group of trunks leading to a different transit or destination switch in the PSTN. Other translation tables use proprietary internal numbering identifications to select the optimum outgoing trunks to reach a specific ultimate DP, based on translation tables which relate the SA (or a portion thereof) of that particular DP to the optimum trunk.

Various transit switches in the PSTN likewise use appropriate translation tables to select the optimum outgoing trunk to convey the item to its ultimate destination. The result of using such translation tables is responsive to the DN of the DP, or to some pre-designated portion of the DN, such as the area code or the central office code. When a called telephone has answered an incoming call, a two-way connection is established through the PSTN trunks and transit switches. In older telephone technology such a connection was established by electrically connecting appropriate wires for each conversation, and the information content of the conversation was conveyed in the form of analog voltage waveforms which were representative of the analog audio frequency waveform occurring at the OP and DP equipment. In modern telephone technology, digitally coded representations of audio wave forms are used and the connection is established by transmitting digital traffic in blocks of various quantities of bits (such as 8 bits, 384 bits, 424 bits, or other) through the links, which permit the transmission of multiple channels via the same link.

FIG. 1 (Prior Art) illustrates the relevant features of a PSTN. The PSTN is comprised of: a first central office switch 100, a second central office switch 200, a first a first telephone handset 102 assigned to SL 19722345678, a second telephone handset 104 assigned SL 19722348114, a third telephone handset 106 assigned SL 1972234987, a fourth telephone handset 202 assigned SL 12147654321, a fifth telephone handset 204 assigned SL 12147652784, a sixth telephone handset 206 assigned SL 12147659156, a transit trunk switch 300 and a signal transfer point (STP) 400. Various telephone lines 101 connect telephone handsets 102, 104, 106, 202, 204, 206 with the COs 100, 200.

The first CO is assigned area code 972, and central office code 234, and contains within it an internal controller computer 110, a first line module 132, a second line module 134, a third line module 136 and a switching matrix 140. The internal control computer 110 contains a central processing unit (CPU) 112 and data memory 114. Data memory 114 stores tables 115–118.

The second CO is assigned area code 214, and central office code 765, and contains within it an internal controller computer 210, a fourth line module 232, a fifth line module 234, a sixth line module 236 and a switching matrix 240. The internal control computer 210 contains a central processing unit (CPU) 212 and data memory 214. Data memory 214 stores tables 215–218.

In operation, a user lifts the first telephone handset 102 and the first line module 132 detects that its assigned point has been activated. The user then hears a dial tone, and dials the directory number (DN) of the fourth telephone handset 202. The first line module 132 communicates with the DN of the telephone handset 202 with the first internal control computer 110 through internal data links 138.

Table 1 is a simplified partial CO table which shows ILANs, the status of those ILANs, and the last four digits of the DN assigned to an individual ILAN. A table such as Table 1 is typically used for billing purposes and to allow the use of calling line identification (CLID) functions.

TABLE 1

| Line Appearance Number | In/Out of Service | Last 4 Digits of DN |
|---|---|---|
| 19316 | 1 | 8114 |
| 19317 | 1 | 5678 |
| 19318 | 1 | 4987 |
| 19319 | 0 | — |

On a computing level, the CPU 112 uses Table 1 to translate the ILAN of the line module 132 into the DN of its assigned SL. Here, Table 1 is used to find that first line module 132, associated with ILAN 19317, is in service (represented in Table 1 by a "1", whereas a "0" would indicate that a line is out of service) and that the first line module 132 is assigned to DN 5678. Although a four digit partial DN is shown, it should be understood that the use of larger partial DNs can be used and their use is well known in the art.

The control computer 110 proceeds to separate the dialed digits into code sections. For example, the dialed digits 1-214-765-4321 have a country code section "1," an area code section "214," and a central office (CO) code section "765."

Table 2 shows which trunk group is assigned to an area code. In our example, area code 214 leads to a trunk group 143 which is identified with proprietary internal outlet trunk group number 3 in Table 2. Proprietary group 3 is identified with outgoing trunk 143.

TABLE 2

| Area Code | Outlet Trunk Group Number |
|---|---|
| 213 | 1 |
| 214 | 3 |
| 215 | 2 |
| 216 | 2 |

Thus, the control computer 110 detects that the dialed DN is a United States non-local call by detecting the leading "1", that the call is destined for area code "214", and for the central office number "765" within area code "214." For illustrative purposes, should the call have been directed to a DN within the same CO 100, outgoing trunks would not be selected, but a table such as Table 3 would have been used to complete the transaction to the proper ILAN and DP. Table 3 represents data resident in data switch 200, but a similar table is resident in switch 100 and other switches. Table 3 translates the CO's DNs into ILANs.

TABLE 3

| Last 4 Digits of DN | In/Out of Service | Line Appearance Number |
|---|---|---|
| 4319 | 0 | — |
| 4320 | 1 | 31597 |
| 4321 | 1 | 26433 |
| 4322 | 1 | 1325 |

After the control computer 110 selects the appropriate trunk group 143, the control computer 110 selects an idle line or channel within the trunk group 143 which is then connected to the originating telephone handset 102 through an internal switching matrix 140.

The control computer 110 then sends an initial address message (IAM) signal on the signaling channel 401 to inform the signal transfer point (STP) 400 of the line being used within trunk group 143 to send the transmission. The STP 400 uses this information to inform the transit trunk switch 300 and the second CO 200 of the impending transmission. The transit trunk switch 300 may possess computers, tables, and a switching matrix similar to those shown in the COs 100, 200. The transit trunk switch 300 routes the transmission, in a manner similar to that already described, from the first CO 100 to the second CO 200 on the outgoing link 303. Next, processor 210 examines the dialed digits data within the IAM. The last four digits of the DN are then used as the input to Table 3. From Table 3, it is seen that DN 4321 is in service and corresponds to line appearance number 26,433 which runs to line module 232. Control computer 210 then tests to see if the line is idle or busy via means well known in the art, and rings the line if not busy.

The control computer 210 then sends a S7 formatted message back to the control computer 110 through the signalling link 404 via STP 400 to confirm the ringing status of the incoming transmission. The control computer 210 also signals a tone generator (not shown) to send a ringing tone to the originating DN. Once the destination DN telephone handset 202 is lifted, the control computer 210 connects the transmission from the transmission trunk switch 300, through the switching matrix 240, and to the appropriate line module 232 and signals this status change back to original switch 100. As soon as either party hangs up the telephone handsets 102, 202 the CO for that telephone handset detects the event electronically and sends a release signal to the other CO and releases the relevant network links. The other CO typically responds to the release signal to confirm release of the transmission.

Table 4 illustrates that trunk groups are also assigned to central switching offices in a similar manner. For example, within an area code 214, end office code 767 leads to Outlet Trunk Group Number 1 from transit switch 300.

TABLE 4

| End Office Code | Outlet Trunk Group Number |
|---|---|
| 764 | 2 |
| 765 | 3 |
| 766 | 3 |
| 767 | 1 |

Problems in the Prior Art

Most users of both a voice telephone and a fax machine are forced to obtain a separate distinct SA for each device to allow proper transmission. This is an example of the causes which have resulted in number exhaustion and the need for many new area codes which costs telephone administrators and telephone subscribers money and resources to modify the system and change all identification (directories, stationery and the like). Furthermore, with enough available DNs in a network, systems already exist that allow for error detection of incorrectly entered DNs. The exhaustion of available DNs reduces or eliminates the ability to assign DNs in such a way as to allow such error detection. Numerous other improvements in telephone dialing plans are desirable, but are not possible to implement in the prior art, due to the pressure of number exhaustion.

In the prior art, a telephone line user is normally forced to obtain a separate distinct SA for each line and/or device connected to the PSTN. This has resulted in number exhaustion and the need for many new area codes which is inconvenient and costs telephone subscribers and administrators money, and which causes delayed or often misdirected communication.

Parity check codes or alternating digit check sum codes are just two of many error protection codes well known in the art, and are used in internal portions of existing telecommunications networks, where data is exchanged from one machine to another. Error protection codes for human entry of such numbers as credit card and bank account numbers have already been used in data processing systems. But error protection codes have not been used heretofore for the human entry of a DN or other symbolic network address in a telecommunications or transportation network. The exhaustion of available DNs reduces or removes the ability to allow DN entry error protection or to use protected central office codes (a method well known in the art to allow use of local telephone 7 digit dialing in boundary areas of different area codes).

The use of multiple DNs by a user can create other problems. For example, the user must often list four or five telephone numbers on business cards, directories and stationery for voice, fax, cell phone, children's residential line(s), etc. Multiple DNs also confuse persons trying to reach the user, resulting in faxes going to voice lines and voice calls terminating at data receivers.

So-called "500" or "personal agent" number services exist in the prior art. In these services, callers dial one special DN such as 1 500 876 5432 to reach a particular person. As a result of calling this one DN, pre-programmed switching equipment will in turn dial to one or more pre-designated explicit DNs, either sequentially (in what is called a hunt sequence) or simultaneously, and then connect the originator to the first one which answers. This personal agent service in the prior art is ultimately unsatisfactory for many users because: first, it requires the use of one additional explicit DN rather than reducing the quantity of explicit DNs; second, it does not distinguish various distinct functional properties such as a voice line compared to a fax line and would require use of a separate and additional personal agent explicit DN for each distinct line group having a distinct functional property set; third, due to these two aspects of its operation, it exacerbates rather than alleviates the basic problem of number exhaustion.

Some networks, or portions of certain networks, are distinguished from others, which are technologically similar and nominally compatible, because they are operated by unaffiliated or competitive businesses. In some cases, these distinguishable networks do not serve all destinations for legal or business competitive reasons, even though an otherwise valid SA is used by the originator. In telecommunications networks, the advent of local number portability (LNP), now mandated by the government telecommunications regulatory agencies of several nations to encourage local exchange carrier competition, requires the telephone network as a whole to establish a network path to the proper destination for a user, even when that user's telephone line is now on a "new" competitive local exchange operator/administrator's CO switch, and is no longer served by the CO having the nominal area code and CO code of that user's pre-existing explicit DN. Various methods for effectively either forwarding such calls or re-originating such calls after performing a global title translation (telephone jargon for substitution of a distinct destination explicit DN derived from an appropriate translation data list) on the dialed digits have been espoused by various interests in the telephone industry. All of these proposed methods have the undesirable result of requiring multiple explicit DNs for each such subscriber, and thus greatly exacerbating the number exhaustion problem. Similarly, in transportation networks, certain SAs are not accessible to all networks, such as the post office box number which is not accessible to a non-postal parcel delivery service. In the propr art of transportation there is no network solution to this problem and such items are usually undeliverable.

Therefore, there exists the need for a system and method of network addressing and translation which is substantially automatic is more accurate than the state of the art, and can automatically connect an origin point to a corresponding compatible destination point.

SUMMARY OF THE INVENTION

In one embodiment, the present invention provides a network for transporting an item between points within the network. To achieve this purpose, the network comprises at least one origin point and at least one destination point, at least one node, a link for connecting the at least one origin point and the at least one destination point to the at least one node, and a routing system for directing the items in the network from the origin point in the network to the destination point in the network. The routing system comprises an explicit destination address and a functional property code.

The invention can provide additional features. For example, the invention could include routing tables for directing the item being transferred to a predetermined destination point based on the explicit destination address and the functional property code. The invention has particular application to particular networks, such as where the network is a telephone network, and the at least one node includes a central office, or in a mail system where at least one node includes a post office, or in a fluid pipeline network. To insure the integrity of transferred items, the routing system could provide an error detector for detecting an invalid address or an invalid item characteristic, which could include tables in memory.

Alternatively, the present invention is a method of routing items in a network. The method of routing comprises the steps of assigning a first explicit address to a first subscriber assigning a second explicit address to a second subscriber, assigning predetermined functional property codes to the network origin point(s) and to the network destination point(s) to distinguish dissimilar points from each other, placing an item into the network at the at least one network origin point for delivery to a specified destination point, the item carrying the network destination point explicit address and at least one network origination point functional property code for the specified origination point, and routing the item at a node for delivery to the specified network destination point, the routing based on the network destination point explicit address and on a matching of functional property codes for the specified origination point and destination point, and removing an item from the network at the network destination point.

Additional steps could be used. For example, the method of routing could comprise the step of assigning a pseudo-directory number to the item at a predesignated node for facilitating the transport of the item within the network. Also, the routing step could be accomplished through the use of routing tables.

The functional property codes can be supplied by many means. The functional property code could be entered by a user or by the network administration. Alternatively, the functional property code can be assigned in conjunction with answering a call. A FP code may be assigned in advance of placing a call, or in conjunction with placing a call.

An address may be defined as destination points having a common directory number (DN) and different property codes or a destination point may be referred to as a destination point with a DN having a plurality of lines each having different property codes.

DETAILED DESCRIPTION OF A PREFERRED EMBODIMENT

Figure 1:
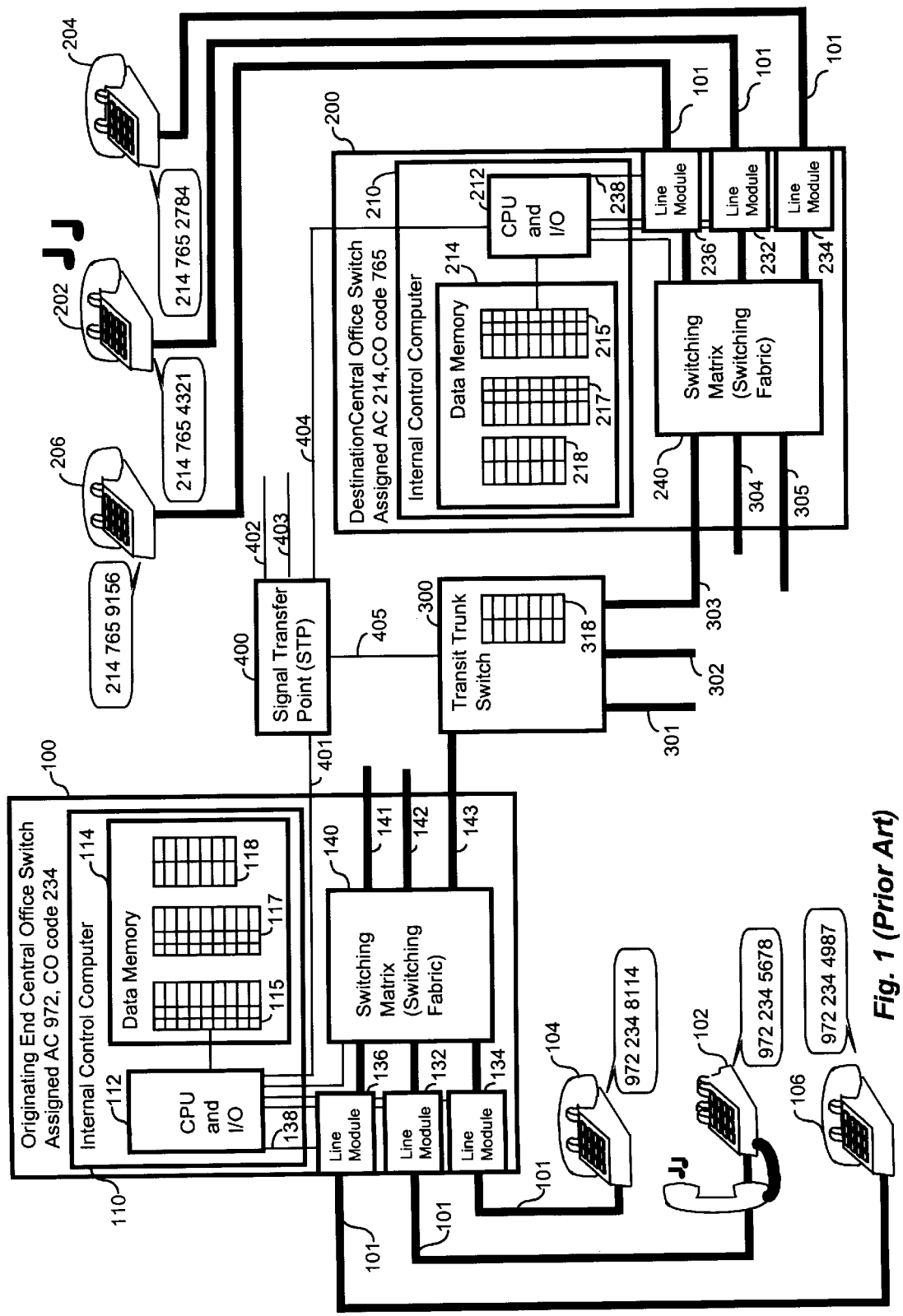
FIG. 1 (Prior Art) illustrates the relevant features of a PSTN.

The present invention provides a system and method of processing origination and destination functional property (FP) codes related to each selected point in a network and a method for using the FP codes, in conjunction with explicit network address, to control routing in a network. The present invention assigns one symbolic explicit network address to one or more of destination points assigned to a subscriber or group of subscribers. The complete address comprises the explicit destination address, the functional property code and may include additional address indicators. Each destination point or preselected set of destination points is assigned a FP code to help distinguish it from other points in the network. When a plurality of points have the same symbolic explicit network address and FP code(s), a distinct transaction indicator code is assigned to uniquely distinguish each such point.

Typically, the functional property of a network point is determined in part by the specific equipment located at the network point. This enables routing systems to be developed such that a point with one FP code may automatically send and receive items to points with compatible FP code(s) when non-compatible devices share the same symbolic explicit network address. Alternatively, the FP code may be entered by a user when necessary to change the current functional property of that network point (such as when a telephone handset is temporarily replaced by a fax machine) or redirect a network path.

Preferred Embodiment in a Telephone Network

In the present embodiment of the invention, two distinct types of symbolic address are used, each one in conjunction with appropriate parts of the network. One type comprises an explicit destination address of the conventional DN type together with appropriate functional property codes, and a transaction indicator code (described below). In the preferred embodiment, the FP code(s) and the transaction indicator code will be carried in separate information elements of the S7 messages used in the network, and not in the same information element as the conventional DN.

A second type comprises a pseudo-number and may or may not also include FP codes and a transaction indicator or origination point distinguishing code. A pseudo-number comprises one or more of the following: a binary bit string having the form and length of a conventional DN but optionally including BCD digit codes which are not used in the prior art (this particular type is used in the preferred embodiment example below); a conventional DN of possibly different length than as in the prior art, supplemented with additional prefix, infix and/or suffix digits all of which are carried in the same information element of an S7 message; a conventional DN supplemented by other numbers where said other numbers are carried in a separate information element (either newly defined or already defined in the prior art) of an S7 message; a number expressed in a non decimal based number system such as, but not limited to, the triskadecimal number system, or a representation or a mapping thereof into a binary number representation; an internal, and in some cases proprietary, ILAN appropriate to the switching node associated with the destination point; an internal or intrinsic, and in some cases proprietary, identification number appropriate to the end point equipment such as the mobile identification number (MIN), international mobile equipment identity (IMEI), temporary mobile service identity (TMSI) or other end point identifiers used with mobile, cellular or PCS telephones, secure telephone units (STUs such as STU-3), or answer-back codes of data terminals, or the like; and finally a combination of more than one of these aforementioned types.

In the preferred embodiment a table of a origination related FP codes is located at the network switching node associated physically with the OP, and the translation related thereto for originations are performed at the same place. The destination-related data tables and the translations related thereto are at an intermediate node called, a service control point (SCP) node of the network, and not at the destination switching node. This particular choice is illustrated here because it is congruent with certain currently ongoing developments for LNP in the North American PSTN, and can therefore be implemented quickly with minimum immediate software development. The origination-related data and processes could equally well be located at an intermediate network node such as the SCP, or at the destination switching node. The destination-related processes could equally well be located at the destination or even at the origination switching node. Thus, the data table used for a translation need not be co-located with the site of the translation process which uses the table.

Each of these different choices of symbolic addresses would affect the amount of data transfer traffic in the network needed to establish a network path, and/or would permit the use of multiple copies of the relevant data lists and processes to help minimize some traffic or for greater reliability. For example, a substantially complete duplicate destination related translation table and process can be advantageously implemented at the destination switching node.

In a cellular or PCS system, either or both of these data lists and processes could be resident at an existing processing center relevant to such a system, for example a home location register (HLR) or any other such subsystem. Any or all of these data tables and processes could equally be resident in switching node equipment such as a private branch exchange (PBX) and/or key system, or separate computer connected to the telephone network by any one of several already-known computer-telephone interfaces, perhaps at the end user's premises. When such a switching node does not have signaling capability for S7 messages which, with appropriate modifications, are the messages used in the preferred embodiment, appropriate new or modified alternative forms of signaling available in the relevant network may be used instead.

Such alternatives could include primary rate interface (PRI) and basic rate interface (BRI) integrated services digital network (ISDN) signaling based upon signaling standard 1.451 and Q.931 and related substandards.

Figure 2:
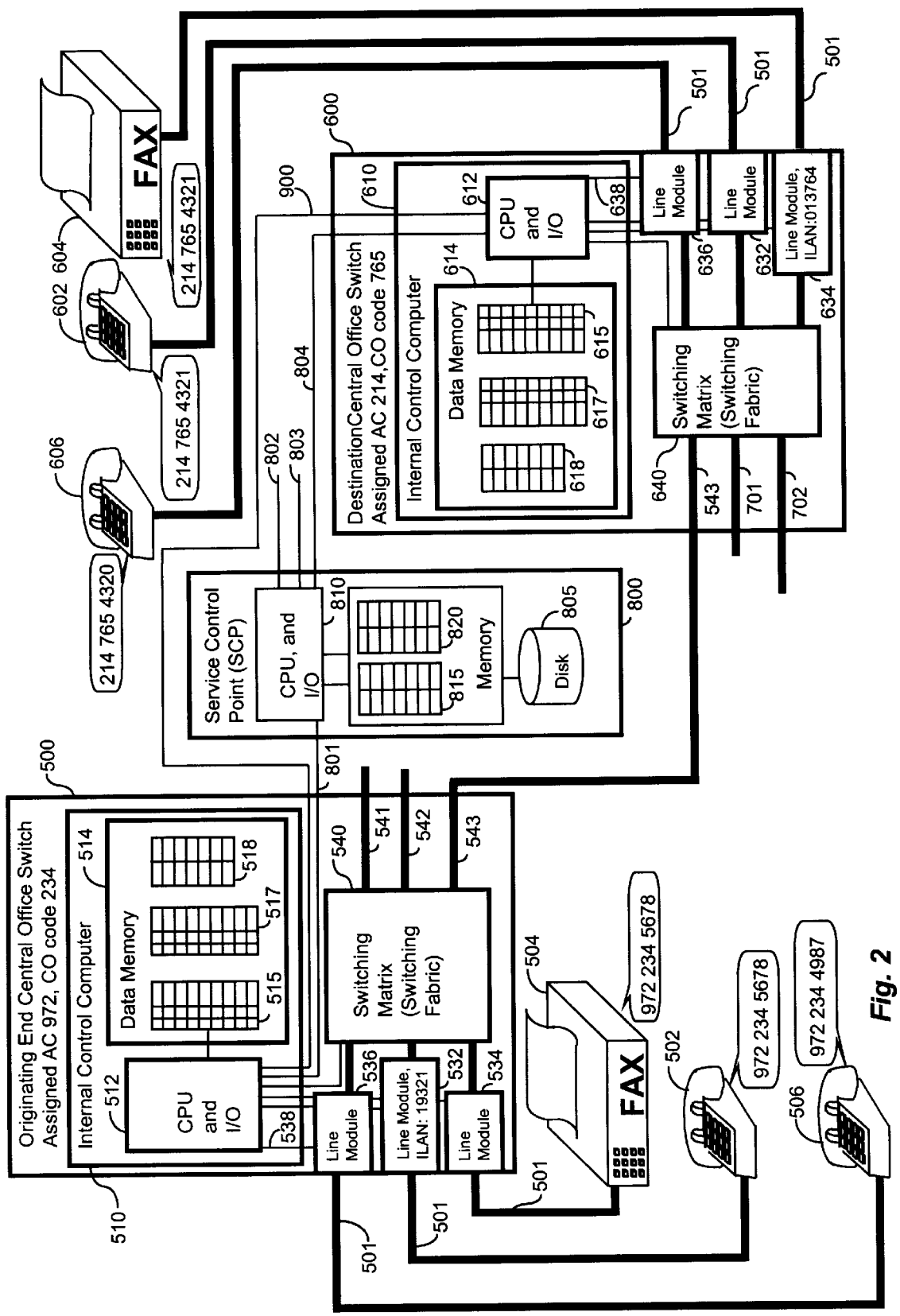
FIG. 2 shows one embodiment of the present invention.

FIG. 2 shows one preferred embodiment of the invention. The PSTN is comprised of the following points: a first central office switch 500, a second central office switch 600, a first telephone handset 502 assigned to DN 19722345678, a fax machine 504 assigned DN 19722345678, a second telephone handset 506 assigned DN 1972234987, a third telephone handset 602 assigned DN 12147654321, a second fax machine 604 assigned DN 12147654321, and a fourth telephone handset 606 assigned DN 12147659156, a transit trunk switch 700 and a signal transfer point (STP) 800. Various telephone lines 501 connect points 502, 504, 506, 602, 604, 606 with the COs 500, 600 respectively.

The first CO 500 is assigned area code 972, and central office code 234, and contains within the first CO 500 an internal controller computer 510, a first line module 532, a second line module 534, a third line module 536 and a switching matrix 540. The internal control computer 510 contains a central processing unit (CPU) 512 and a data memory 514. The data memory 514 stores tables 515–518.

The second CO 600 is assigned area code 214, and central office code 765, and contains within the second CO 600 an internal controller computer 610, a fourth line module 632, a fifth line module 634, a sixth line module 636 and a switching matrix 640. The internal control computer 610 contains a central processing unit (CPU) 612 and a data memory 614. The data memory 614 stores tables 615–618.

In FIG. 2 two subscribers each have multiple telephone lines installed. A Subscriber A has a voice line, 502, and a telefax line, 504. A Subscriber B has a voice line, 602 and a telefax line, 604. All of the particular subscriber's lines need not appear at a single CO switch, as is shown in FIG. 2, but may appear at many different central offices throughout the PSTN. Software required for the embodiment of the invention are shown as resident in the two central offices and the SCP 800.

Property codes include one or more FP codes. FP codes may be entered into data lists in various ways, some of these involving the human user of the line. Table 5 illustrates several example FP codes which can be entered by the user of the line. This example shows FP codes in a form which can be entered from a telephone dial and which are therefore designed to begin with the symbols *2- (they could equally well begin with *3-, because *2 and *3 are not presently assigned for existing so-called vertical service codes in the numbering plan of the North American PSTN. As is well known in the art, the two digit sequence "11" may be substituted for "*" when dialing from a rotary dial telephone. Any entry codes which are compatible with the national numbering and dialing plans of a specific national PSTN may be used for this purpose, and need not be the precise codes and values shown in Table 5. Additional functional properties may be defined in the future, and some or all of the codes shown in Table 5 may be omitted in an embodiment.

FP codes can also be entered and modified by the user through the medium of a data terminal and data communication link to the relevant data lists, which can be accessed via data modem, Internet access, and many other means well known in the art. A so-called graphic user interface (GUI) in conjunction with said data terminal is beneficial to continually display the current status of FP code entries and their implications. By use of such data terminal and/or GUI the entry of FP codes can be made more convenient and less susceptible to human error. Furthermore, the representation of each FP need not be restricted to numeric codes, but instead descriptive names and/or graphic symbols or icons may be used. Whether using dial, GUI or other forms of entry, the user can also be prompted by synthesized speech confirming and/or prompting announcements while entering FP codes.

For clarity of explanation, we use the same representation of these codes internally and in Table 5. The internal form of the FP codes need not be the same as the external or entry form illustrated in Table 5. The use of the asterisk (*) and the succeeding digit 2 in these tables is also done for clarity of reading, and would not be used in actual internal codes. Thus, the present invention is not limited to the North American PSTN. The length of each FP code is also not limited, although only certain short codes are illustrated here. Therefore, there is no inherent limit on the quantity of FP codes which can be defined in the future.

| User-Assigned FP code and associated data value. | Significance or Category | Comment |
| --- | --- | --- |
| *2 | Substitute preset temporary FPs | Used only on per call basis. |
| *2200q . . . q: Primary Language | Human Language capability code. | Primary language designated by *2200q . . . q, used for internal recorded announcements or the like. |
| *2233: French | Individual codes are taken from international country code of nation or region where that language is predominant. Certain ambiguous codes (1, 41, etc.) are not permissible. | |
| *2234: European Spanish | | |
| *22413: Swiss German | | |
| *2244: English | | |
| *2249: German | | |
| *2252: Mexican Spanish | | |
| *2203: Esperanto | | |
| *23 | Fax machine Group 3 or Group 4 | Extensions 233 for G3 only, *234 for G4 only, etc. |
| *24 General Modem | Data Modem and telecommunications | Extensions for specific data rates |

-continued

| User-Assigned FP code and associated data value. | Significance or Category | Comment |
|---|---|---|
| *246 TTY/TDD | device for the deaf | and protocols may be used |
| *252: Administration<br>*253: Repair/warranty<br>*254: Personnel<br>*2542: Hiring<br>*2543: Verify employment<br>*255: Financial<br>*2552: Accounts Receivable and Billing Inquiries<br>*2553: Accounts Payable<br>*2582: Purchasing<br>*2583: Sales | Organizational or Departmental Activity Code | Many extensions for other departments and for specific industries may be defined. |
| *262: Selective answer [list]<br>*263: Selective call forward [list with distinct target number for each]<br>*264: Passcode access [code list]<br>*266X: transfer after X rings<br>*267: Connect to previous subscriber (similar to Automatic Intercept Service)<br>*268N . . . N: Call forward all.<br>*260: Selective block [list] | Access Control: Particularly when answering user pays for connect time (as in cellular/PCS) or does not wish to receive calls from all callers. Passcode has complementary significance for origination and destination entries. | Passcode access requires the caller to present a passcode to gain access. |
| *272: Human Assistant<br>*273: Answer Machine<br>*274: Cellular/PCS line<br>*275: Radio Pager line | Non-primary Lines | |
| *282: Child(ren)'s Line<br>*2822: Oldest Child<br>*2823: Second Child, etc.<br>*283: Spouse: wife<br>*284: Spouse: husband<br>*285: Male grandparent<br>*285: Female grandparent | Family Relationships | |
| *292: Dest Inputs Follow<br>*293: Orig Inputs Follow<br>*294: Read back FP code status<br>*295: Clear all FP codes<br>*296: Cancel last FP entry<br>*297: Negate next FP entry.<br>*298: Cancel next FP entry. | FP input help. Pre-inputs made before using *292 or *293 are understood to apply to both origination and destination. | FP code status read back is synthesized speech in designated primary human language. Negate example: *297*273 = "Don't connect me to answering machines." |

TABLE 5

Examples of User-assigned FP Codes

*202: Retain all pre-input background FP codes when using a per-call FP entry. If negated, temporarily ignore all pre-input codes, using only FP codes entered per-call.
*203: Connect if any FP codes match, rather than all.
*204q . . . q: Set calendar/clock/day-of-week/etc. time intervals for validity of specific FP code sets, via parameters . . . q.

Control of alternative logical choices. Compatibility tables and origin-destination conflict rules also apply to matching operations. Notice that *297 prefix negates such orders. FP entry help to structure groups of entered FPs.

Permits user control of imperfect matches, handling of busy lines, etc. Origination and/or destination may govern in various cases when in conflict. Time interval settings allow automatic use of different pre-determined FP code sets at certain times of day, on certain days of the week, TABLE 5-continued Examples of User-assigned FP Codes

*205: Upon per-call origination FP code entry, suspend only those pre-input FP codes which are non-compatible.
*208 Prefix for preset per-call FP group used with a *2
*209 Indicates following dialable DN is entered but not dialed etc.

In addition to the FP codes which are under the control of the user and illustrated in Table 5, fewer FP codes may be used, under the control of the network administrator only. Table 6 shows a few proposed FP codes of this type. The numeric value of these administrator-assigned FP codes need not begin with *2- because they are not user-entered from a dial and are not visible to nor under control of the user.

TABLE 6

| Administration-Assigned FP code and associated data value. | Significance | Comment |
| --- | --- | --- |
| 60: | Destination: DN not in service. | Network can play informative recording in primary language of originator. |
| 70: q . . . q | Destination: This explicit DN is no longer active at nominal switching node. Its pseudo-number is q . . . q | Similar Result to Local Number Portability. |
| 80: N . . . N | Destination: The DN of this line was formerly used by a subscriber whose current DN is N . . . N | Similar to Automatic Intercept Service (AIS). |
| 90 | Origination: This line is authorized to originate emergency traffic. | Used only for selected governmental or emergency services. |
| 91 | Destination: traffic to this line is presently restricted due to a temporary local emergency. | Network can play an informative recording to explain the situation and prevent continual retries. |

The network administration may also automatically set certain user-controlled FP codes at installation time, if so desired. For example, a default human language code may be set by the administrator for certain areas so that the customer who does not like technology or does not wish to enter the FP codes of this invention may nonetheless gain the advantages thereof. It should also be understood by those skilled in the art that some FP codes such as *2 or *292 or *293 are not transmitted over the network.

When a call is originated, as will be explained in more detail below, the call processing message to establish the call, a modified IAM message in S7, will comprise the appropriate origination FP codes. These origination FP codes are analyzed by the software controlled control computer associated with the destination FP translation process, to compare with the destination FP codes for each destination point having that particular explicit DN.

When there is only one destination line installed with the relevant explicit DN, the objective of the FP analysis process is to proceed to ring that line only where there is an appropriate match of the relevant FP codes. When there is not, the line should not ring and an appropriate recorded announcement may be played to the originating line, in the originator's primary language or by a signal compatible with the origination point terminal equipment, to explain the reason. This will have the beneficial effect of neither producing a connection path though the network nor using further network resources when no compatible destination line is in place. Further details on the process of matching the FP codes are given below.

When a plurality of destination lines are in service with the same explicit DN, the objective of the process is to find the first un-engaged destination point among said plurality of destination points which has matching relevant FP codes and then to ring or otherwise cause alerting status of that DP and establish a network path connection if it answers. If there is no DP, among said plurality of DPs, with compatible FP code(s), the handling should be as described for no match in the previous paragraph for a single DP. If there are multiple DPs with matching FP codes, the precise choice of DP among said multiple DPs with matching FP codes may be made by means of sequential hunting (also known as "roll-over" or "group hunting") by examining the multiple DPs with matching FP codes in a predetermined order, and then using the first non-busy DP as the particular destination. If all said multiple DPs with matching FP codes are busy or otherwise unable to receive a connection, the attempted call may be treated in the traditional manner of a busy status.

When there are a plurality of OPs or a plurality of DPs which bear the identical explicit DN and FP code(s), and are thus otherwise ambiguous, a further data value, described as the transaction indicator code, may be comprised in the relevant messages in the network, one such transaction indicator code for each end which has a plurality of potentially otherwise ambiguous end points.

The transaction indicator has the function of preventing ambiguity of identification of the proper physical end point in cases where such network features as call trace or call completion to busy subscriber (CCBS) is used.

The transaction indicators, in one embodiment, may be assigned in the chronological order in which destination points are installed or placed into service, drawing the transaction indicator codes without duplication from the pool of numbers 1, 2, 3, 4, etc. One could also assign a transaction indicator to each relevant end point in a group dynamically as a connection setup process begins to affect the DP, drawing the transaction indicator codes without duplication from a pool of numbers 1, 2, . . . N, (where M is the number of potentially otherwise ambiguous end points in said group already installed at the relevant switching node), and then returning each such transaction indicator code value to said pool dynamically as each such connection or CCBS state ends.

In preparation for operation, the administration and/or the user enter(s) FP codes relevant to telephone lines connected to the telephones 502, 506, 602 and 606, and for fax machines 504 and 604. The administration and user input software has appropriate data access to both data tables via data communication means already well known in the art. The user lifts the handset, and, upon hearing a dial tone, enters the desired FP codes in the appropriate sequential order, and then hangs up. Once the subscriber and administrator has/have entered the appropriate origination and destination FP codes, the codes which are relevant to origination are stored in table 515 for switch 500 and table 615 for switch 600, and the codes which are relevant to destination are stored in table 515. The input entry and storage of said codes are controlled by processors 512, 612 and 810, by means which are well known to those skilled in the art. The transfer of destination related FP codes from control computers 510 and 610 to control computer 810 and disk 805 will utilize newly defined but straightforward S7 message formats, by means well known in the art. The transfer of FP codes from control computer 510 to data table 515 and from control computer 610 to data table 615 is likewise well known in the art.

In operation, a user lifts the first telephone handset 502 and the first line module 532 detects that its assigned point has been activated. By means and method well known in the art, the user handset 502 is connected to an internal dial tone generator (not shown), and the user dials the explicit DN 1 214 765 4321 of the desired destination point, which is a second destination telephone set 602. Take note that the fax machine 604 connected to the second CO switch 600 also has this same explicit DN as well.

Upon completion of the dialing, control processor 510 of the originating switch 500 utilizes table 515 to obtain the data values needed for setup of a connection path through the network. Part of the contents of table 515 from FIG. 2 are illustrated in Table 7.

TABLE 7

| ILAN | IN/OUT of service | explicit DN (last 4 decimal digits) | FP origination code(s) |
|---|---|---|---|
| 19317 | 1 | 8114 | *220044*282 |
| 19318 | 1 | 5678 | *23 |
| 19319 | 1 | 4987 | *220044*2252*255 |
| 19320 | 0 | — | — |
| 19321 | 1 | 5678 | *220044 |

Table 7 discloses that ILAN 19321 corresponds to the first (originating) telephone 502, that it is in service, that it has been assigned explicit DN 1 972 234 5678, and its FP code indicates that it is a voice line with English as the principal (and only) language. ILAN 19318 corresponds to the fax machine 504 of the originating switch 500. It also has the same explicit DN 1 972 234 5678, but its FP code indicates that it is a fax machine. ILAN 19319 corresponds to the remaining telephone 506 connected to originating switch 500. It has explicit DN 1 972 234 4987, and is a voice line with English as the principal language, but will also use the Mexican Spanish language, and desires to reach the financial department of any destination. ILAN 19317 corresponds to another telephone not illustrated in FIG. 2, which is assigned explicit DN 1 972 233 8114, has English as its principal language, and wishes to reach a child's line at a destination. ILAN 19320 is not in service at this time.

Table 7 is simplified in several ways for clarity of exposition. Many PSTN CO switches are large enough to have 30,000 telephone lines or even more, and would thus be assigned two additional CO codes, such as 233 and 235 in addition to 234. In such a large switch, Table 7 would use the last 5 (or more) rather than the last 4 decimal digits of the explicit DN to unambiguously identify each line. In a switch wherein only a limited number of telephone lines have the special FP codes of the present invention methods could be applied to optimize data structures to avoid wasted memory space corresponding to "empty" FP spaces, and are also applicable to a preferred embodiment of the present invention even though not illustrated explicitly in Table 7. For example, the column corresponding to the FP values in Table 7 could be replaced by a "column" which carries a binary number pointer. This pointer would be set to the special value 0 for "rows" which have no assigned FP values. A non-zero pointer value would be entered if FP values are assigned to the telephone line corresponding to that particular row. Such a non-zero pointer is the "index" of a separate table comprised of FP values (not shown). At a later phase of installation, when the majority of telephone lines have FP codes assigned, the structure of the table can then be changed to the form represented in Table 7, with all the origination FP information appearing in the same table as the DN digits.

At this point in the operation of the invention, the origination control processor 510 has available within it the dialed explicit DN of the desired destination 1 214 765 4321, the explicit DN of the origination line 1 972 234 5678, and also the FP code *220044 of the origination line. The origination control processor 510 then makes up a modified initial address message (IAM) comprising these data elements and a transaction identifier code, which IAM message is transmitted via data link 801 to the SCP 800. The IAM is here described as modified because an IAM message comprising the destination explicit DN and the origination DN, without the novel data elements taught in the present invention, is already well known to those skilled in the art and used in S7 signaling to begin the connection setup process. Upon receipt of said modified IAM message, the processor 810 in the SCP 800 examines the internal translation data table 815, which is represented in part in Table 8. This table is novel due to the presence of FP codes and pseudo numbers and does not exist in the prior art.

TABLE 8

| Explicit DN | Destination FP Code(s) | Destination Pseudo-Number |
|---|---|---|
| 1 214 765 4320 | *23*2583 | 1 214 765 8h24 |
| 1 214 765 4321 | *220044 | 1 214 765 4321 |
| 1 214 765 4321 | *23 | 1 214 765 1t27 |
| 1 214 765 4321 | *275 | 1 817 6h1 2r5t |
| 1 214 765 4322 | (none) | 1 214 765 4322 |

The SCP control computer 810 examines the entries in table 815 which have the explicit DN 1 214 765 4321. The representation of a part of table 815 in Table 8 discloses that there are three such "row" entries. Said control computer then examines the FP codes for each such row, and compares them with the FP code *220044 which is comprised in said IAM message, and finds a match for the first of the three such entries. The SCP control computer 810 then makes up an S7 message which is returned to the origination control computer 510 via data link 801. This message comprises the pseudo-number 1 214 765 4321, taken from the appropriate row entry of table 815, as well as other data elements comprising the input IAM message, and some other data elements as well. (The letter symbols h, r, and t which occur in other pseudo-number entries are explained below.) This process of returning a different value in the format of a DN is known as a global title translation, because in general a different and distinct number value in the format of a DN is returned as a result. In this particular example, the value returned is the same as the explicit DN given as an input component, but a later example will be distinct. Further details of the process and examination of the matching FP codes are also described below.

After thus receiving the translated pseudo-number DN, the origination control processor 510 then produces a new IAM message, which contains the thus translated pseudo-number. This new IAM message is sent to the control processor 610 in the destination switch 600 via data link 900. In most large PSTN systems, a direct data link would not usually exist between all possible origination and destination switches, so numerous data switching nodes called signal transfer points (STPs), performing the functions of a so-called packet data switch, are provided for the data links, although not illustrated here. Following receipt of this second IAM message at the control processor 610 of the destination switch 600, a further exchange of messages take place between the two switches 500 and 600, which are well known to those skilled in the art and are well documented.

The result of these message transactions is that a channel for telephone traffic is set up between origination switch 500 and destination switch 600 via trunk 543. Furthermore, once the destination point answers, the connection established in the destination switch 600 carries the channel from trunk 543, via the internal switching matrix 640 to the line module 632 and the appropriate destination telephone set 602. This connection is established because destination control processor 610 uses table 517 to determine the correct ILAN for the incoming pseudo-number 1 214 765 4321. A portion of table 517 is represented by Table 9.

In most large PSTN systems, a direct trunk link would not exist between all possible origination and destination switches, so numerous transit trunk switching nodes are provided for the trunk links. Although not illustrated here. These switches are directly or indirectly controlled by the aforementioned S7 call processing messages in a manner which is well known to those skilled in the art, and their presence and activity is the technical basis of the long-distance telephone switching capability of the PSTN.

TABLE 9

| Pseudo-number (last 4 digits) | IN/OUT of service | ILAN | Comment: |
|---|---|---|---|
| 1t27 | 1 | 013764 | fax 604 |
| ... | — | — | several rows omitted |
| 4321 | 1 | 013763 | telephone 602 |
| 4322 | 1 | 026173 | |
| ... | — | — | several rows omitted |
| 8h24 | 1 | 013762 | telephone 606 |
| 8h25 | 1 | 013764 | another pn uses same fax line |
| ... | — | — | several rows omitted |

The row from Table 8 which is relevant to the connection described in the previous paragraphs is the row having pseudo-number 4321 and ILAN 013763. The destination control processor 610 will ring the desired destination line 602 having ILAN 013763 (if it is not already busy), and when the user of that line answers the destination telephone 602, a connection will be established through the destination switching matrix 640 between trunk 703 and line module 632 leading to the destination telephone 602.

One benefit of the present invention is visible when the originator makes a call from the origination fax machine 504 at the origination switch 500. In this case, a sequence of events occurs which is similar to that just described, but with the following significant distinctions. When the originator uses the first (origination) fax machine 504 to dial the same destination DN used in the previous example, namely 1 214 765 4321, the origination control processor 510 sends a modified first IAM message to the SCP 800, but the FP code content of the modified IAM message in this instance differs from the first modified IAM message content in the previous example. In the present example, the FP code is *23, which comes from row ILAN 19318 of Table 7. The transaction indicator (not shown) will, in general, be different from the previous example as well. Due to the different FP code value, when a translation is performed by the SCP 800, the result of the translation will be the pseudo-number value 214 765 1t27, arising from the "row" in Table 3 having that particular value in the pseudo-number "column." An appropriate message is then returned to origination processor 510 comprising within it the thus translated value 1 214 765 1t27, which, as previously indicated, is really "translated" in this example and not merely equal to the input explicit DN. The origination control processor 510 now sends a second modified IAM message to destination switch control processor 610 using data link 900. In this instance, due to the distinct pseudo-number 1 214 765 1t27, the destination control processor 610 will ultimately establish a connection to line module 634 having ILAN 013764, and thus to destination fax machine 604.

Triskadecimal Pseudo-Numbers

It will thus be clear to one skilled in the art how two or more destination telephone lines may have the identical explicit DN 1 214 765 4321, but nonetheless, originators who dial this same explicit DN from distinct origination points, having different predetermined origination FP codes, will each be connected to the respective correct distinct network destination point(s). To further clarify the explanation, we now explain the significance and use of the letter symbols t, h and r in the pseudo-numbers, and certain other significant aspects of the various preferred embodiments.

When a DN is transmitted in the appropriate information element data field of a prior art C7 message, each decimal digit of the dialed number is expressed as a so-called binary coded decimal (BCD) four-bit code. The telephone industry standard BCD codes are shown in Table 9.

TABLE 9

S7 BCD Codes

| 4-bit Binary-Coded-Decimal Value | Significance of corresponding BCD value in S7 signaling called or calling party number information element digit |
|---|---|
| 0000 | digit 0 |
| 0001 | digit 1 |
| 0010 | digit 2 |
| 0011 | digit 3 |
| 0100 | digit 4 |
| 0101 | digit 5 |
| 0110 | digit 6 |
| 0111 | digit 7 |
| 1000 | digit 8 |
| 1001 | digit 9 |
| 1010 | Not assigned (ten: here called t) |
| 10101 | "eleven", or dial button * |
| 1100 | "twelve", or dial button # |
| 1101 | Not assigned (thirteen: here called h) |
| 1110 | Not assigned (fourteen: here called r) |
| 1111 | Does not represent a digit. Used only as the "end of digit string" indicator |

Table 9 indicates that three of the BCD codes are forbidden or not assigned in the prior art. In the particular preferred embodiment of the present invention just now given, these three codes are instead used and are arbitrarily assigned the three letter symbols t, h and r as indicated in the table, to form one of the types of pseudo-numbers. This type of pseudo-number is convenient for initial implementation of the invention because it can make use of the same information element used in the prior S7 art for the traditional DN, having the same length and structure, with the exception that some of the digits can be the previously forbidden four-bit BCD codes t, h or r. One may describe this as a triskadecimal number form of the DN, where the word triskadecimal describes a radix 13 number. When such numbers are expressed digit by digit using a four-bit BCD code for each digit, it is only necessary to define their relative order for the purpose of properly ordering the entries in a consecutive list. It is logical, but actually arbitrary, to establish the order t<h<r for this purpose. Some other order is equally preferable for purposes of this invention. It is also logical, but equally arbitrary for purposes of ordering the list, to order the traditional decimal digits as 0<1<2<3<4<5<6<7<8<9 with <t<h<r following.

At a later time, the network can evolve from the use of triskadecimal numbers to the use of one or more of the aforementioned types of pseudo-numbers so as to have greater flexibility and more DP capacity associated with each switching node. When a data list such as table 517 must be constructed in data memory in a consecutive order described by a binary index corresponding to a triskadecimal index number (and corresponding to the pseudo-number column of Table 9), without gaps in the consecutive entries, then an alternative mapping of the triskadecimal numbers onto the binary numbers is desirable to prevent such gaps of wasted or unused memory. Using the same (arbitrary) order of the three letter symbols described in the previous paragraph, we then establish the consecutive mapping for the three letter symbols: t=decimal 10; h=decimal 11; r=decimal 12 and the ten decimal digits in their traditional values. Consider a four digit triskadecimal number. The translation between the triskadecimal digit representation and the consecutive binary or decimal representation of the same number is then expressed by the algebraic formula:

$$CB = d_3 \cdot (13)^3 + d_3 \cdot (13)^3 + d_3 \cdot (13)^3 + d_0 \cdot (13)^0$$

where CB is the consecutive binary or decimal translation of the triskadecimal value, $d_3$ through $d_0$ represent the four triskadecimal digits in decreasing significance order, or left to right order as conventionally written, (13) is the decimal number thirteen, and superscript numbers represent usual exponents, that is the third, second, first and zero-th power. A small portion of the list of 4-digit triskadecimal numbers and the decimal equivalent of the binary translation of these numbers is shown in Table 10.

TABLE 10

| Four-digit triska-decimal number | CB, the Decimal representation of consecutive binary mapped value |
| --- | --- |
| 0rr9 | 2193 |
| 0rrt | 2194 |
| 0rrh | 2195 |
| 0rrr | 2196 |
| 1000 | 2197 (=13³) |
| 1001 | 2198 |
| 1002 | 2199 |

It is convenient but purely coincidental that the largest 4-digit triskadecimal number, rrrr, is equal to decimal 28,560, which is close to the actual traditional physical line capacity of many CO switches, namely decimal 30,000. Therefore if desired it is both feasible and convenient to install up to 28,561 distinct telephone lines in a CO switch of such capacity, using only one CO code and the standard 7-digit decimal North American Numbering Plan, and yet assign a distinct identity to each line, provided that 18,561 of these 28561 lines have distinct FP codes and each one of these shares an explicit decimal DN with others. If triskadecimal CO codes are used, then extra CO switch capacity can likewise be added to the network by assigning such non-decimal CO codes to such extra switches, which appear as "phantom" network switch nodes. DPs on such phantom switches can only be reached by dialing a related explicit decimal DN for another switch node and utilizing the translation process of the present invention.

Multiple Lines, Same DN
Multiple DNs, Same Line
Some Lines with Same DN on Different Switches Furthermore, certain line appearances in a switch need not share the same decimal CO code used by the explicit decimal DNs resident on that same switch. An example of this can be seen in Table 8. The row having pseudo-number 1 817 6h1 2r5t is in a switch with a non-decimal CO code 6h1 and in a different area code, although its explicit DN is 1 214 765 4321. FP code *275 indicates that it is a radio pager line. It is convenient to install pager lines on such a phantom switch. Origination callers who wish to reach the radio pager of the person having explicit DN 1 214 765 4321 can do so in more than one way. First, such an origination caller can set an origination FP code *275 (either permanently or on a per-call basis, explained below) and then dial 1 214 765 4321. This first method is compatible with the aforementioned FP code in Table 7.

The second method does not require the origination caller to take any steps other than dialing 1 214 7655 4321, but it does require the user of these destination lines to set up FP codes to cause a transfer on ring-no-answer from the nominal primary line to the radio pager line. Table 10 is a modified version of Table 3 showing the appropriate code changes on the line with pseudo-number 1 214 765 4321. The code *2663275 indicates that a call transfer will occur after 3 rings, and the digits 275 therein indicate that the transfer target is the pager line.

Again there are several alternative embodiments of the basic process to control the call delivery. In one alternative, the relevant FP codes for both the voice line and the pager line can be passed to the nominal voice destination switch 600 along with the translated pseudo-number, and that switch 600 can then initiate the transfer via a further global title translation and exchange of messages between SCP 800 and the origination switch 500, by a sequence of events well known in the art and named "crank back." A crank back route setup in telephone jargon involves a tentative call processing connection to a temporary intermediate destination, followed by a retraction of the call and a second call setup to a different destination due to signals which indicate that the first destination is not appropriate.

TABLE 10

| Explicit DN | Destination FP Code(s) | Destination Pseudo-Number |
| --- | --- | --- |
| 1 214 765 4320 | *23*2583 | 1 214 765 8h24 |
| 1 214 765 4321 | *220044, *2663275 | 1 214 765 4321 |
| 1 214 765 4321 | *23 | 1 214 765 1t27 |
| 1 214 765 4321 | *275 | 1 817 6h1 2r5t |
| 1 214 765 4322 | (none) | 1 214 765 4322 |

As another alternative, the destination switch 600 can use conventional call forwarding to pass the payload channel from the origination caller on origination switch 500, for example, into switch 600 via trunk 543, and then out of switch 600 via, for example, trunk 702, towards the destination switch having area code and CO code 817 6h1, which is ultimate destination switch not shown on FIG. 2.

In yet another alternative, the crank back process can also be initiated due to a time-out message from the destination switch 600 to the SCP 800, by means of a newly defined S7 message designed for this purpose. This alternative only requires the SCP to pass the FP data regarding the voice line to nominal destination switch 600, since this destination switch 600 does not need to communicate directly with the origination switch 500 in this alternative embodiment.

In addition to supporting multiple DPs with the same explicit DN, the present invention also supports multiple DNs for a single DP. Table 9 shows two distinct rows which both have the ILAN value 013764. The two relevant lines have different pseudo-numbers, and if we could look at the corresponding entries (not shown) in table 815 we would likely find that there are different explicit DNs involved in these two pseudo-numbers, although we should find that both such pseudo-numbers are assigned to entries which have a *23 FP code indicating a fax machine. In this case, two or more different people can share the same fax machine, which is a very desirable way to avoid both number exhaustion and also to avoid installing more lines and more fax machines than is required by the amount of fax traffic. If there is more traffic than one fax machine can handle, additional fax lines may be installed in a so-called hunt group.

Use with Shared Line, Distinctive Ringing, Digit Spill-Forward

The concept of the present invention also applies to the particular embodiment of a plurality of explicit DNs corresponding to the same ILAN and physical line, but with distinctive ringing cadences (or in general distinctive alerting, in the sense of distinctive number codes used in ISDN or PCS alerting messages). The present invention can be embodied in an implementation in which several pseudo-numbers describe the same ILAN and physical subscriber line appearance, but which likewise are distinguished by means of distinctive ringing or the like. The present invention can be embodied in an implementation in which the internal destination is designated by so-called "spill forward" digits from the PSTN to the destination equipment. Such digits are typically represented by DTMF tones or by digitally coded signals.

FP Matching Process

With regard to proper matching of origination and destination FP codes, which occurs in SCP 800 in the preferred embodiment, certain properties of the matching algorithm are desirable for optimum user convenience. The actual matching algorithm in a particular embodiment of the present invention may differ from the algorithm proposed here without departing from the scope and spirit of the present invention. Certain portions of the matching process may alternatively utilize serial or parallel and substantially simultaneous computation steps. One preferred embodiment of a matching algorithm is as follows: First, for each DP examined, the quantity of FP codes comprised in the message from the OP is compared to the quantity of FP codes comprised in the destination list for each DP examined, and the smaller set of such codes is identified.

Second, certain FP codes which are in a special form having a significance not essential to issues of compatibility are then translated, for purposes of the matching algorithm only, into an equivalent FP code which has a form suitable for matching. One example of this is the code *220044, which indicates that English (44) is the principal language. This particular code would be replaced by *2244 for purposes of matching, since the principal status of English in this case is immaterial to the matching process, although it is significant to selection of the correct primary language for playing a recorded voice announcement. Third, then a code by code comparison is made for each code in the said smaller set of codes, against all the codes in the opposite or larger set of codes.

When performing this comparison, certain FP codes may be physically compatible with each other, even though they are numerically distinct. This can occur in cases of human language, technical end equipment and other contexts. In a technical context, all presently available G4 fax machines are also backward compatible with G3 fax machines, so the FP codes for both should be considered to be compatible until and unless some change in the characteristics of available fax machines occurs. If in future some G4 machines are not G3 compatible, then the end point with such equipment must be appropriately indicated with only the FP code *234, while the ends with fax machines compatible with both standards can be indicated with both codes *233 and *234. In such cases a more general method which does not require the end user to be aware of and enter all such codes, is the use of a compatibility translation process during the said third step of the matching algorithm. This process may be described by a pre-determined compatibility translation table, but even when described in a table for purposes of documentation, the actual internal process may not involve table look up. An example of such a compatibility table is illustrated as Table 11 for the limited list of human languages previously given. An intersection of a row and column having the notation OK indicates compatibility, while a blank indicates no compatibility. Note that European Spanish and Mexican Spanish are compatible with each other (although they are different dialects of the Spanish language), while Swiss German is a dialect which is not mutually comprehensible by speakers of ordinary German. Of course, an educated native of the German-speaking speaking area of Switzerland learns to speak ordinary German in school and would therefore enter both FP codes for his or her telephone line. However, a small number of Swiss German speakers (for example, on a line used only by a small child) may have no facility with ordinary German. Although this sample compatibility table is symmetrical about the main diagonal, there are situations involving types of compatibility where the two off-diagonal entries for corresponding pairs will not both be the same. Therefore, in general, non symmetrical off-diagonal terms need not be identical.

TABLE 11

|  | *2233: French | *2234: European Spanish | *22413: Swiss German | *2244: English | *2249: German | *2252: Mexican Spanish | *2203: Esperanto |
| --- | --- | --- | --- | --- | --- | --- | --- |
| *2233: French | OK | | | | | | |
| *2234: European Spanish | | OK | | | | OK | |
| *22413: Swiss German | | | OK | | | | |
| *2244: English | | | | OK | | | |
| *2249: German | | | | | OK | | |
| *2252: Mexican Spanish | | OK | | | | OK | |
| *2203: Esperanto | | | | | | | OK |

Note that certain FP codes require the testing of yet other data elements or sub-elements. For example, destination FP codes *262 or *263 require that the origination explicit DN match up with one entry on a pre-determined destination list. Destination code *260 requires, to the contrary, that the origination explicit DN not match with any entry on a pre-determined reject list. Destination FP code *264 requires that a pass code data element comprised in the origination S7 message match up with an entry on a pre determined destination list. This FP code permits an originator who is originating a call from an OP other than the normal OP to enter a pass code by means of the symbol sequence *264q . . . q, and thus provide identification and authentication to establish a connection securely when calling from an origination telephone line whose explicit DN is not predetermined, such as a public coin telephone.

If the authentication is not valid, the call may be rejected (according to the particular embodiment) with an optional appropriate recorded announcement or message for the originator, regardless of the other FP code matching results.

The fourth step in the matching algorithm is, in the default case, to declare a match if all of the FP codes in said smaller set have a matching code in said larger set. This is the conclusion of the default matching algorithm. However, in addition to the default of declaring a match only for the case in which all the FP codes in the smaller set each match a corresponding code in the larger set, certain alternate choices may be made in the preferred embodiment, according to preferences expressed by the origination and/or destination presence of FP code *203. This code indicates that the user wants to declare a match in step 4 if there is/are one or more FP codes which match between origination and destination FP codes. If, among the origination and destination FP codes, the origination FP codes comprise *203 although this code does not appear among the destination FP codes, the preferred embodiment is to allow the change from the default (match all) to the special case (match at least one). However, an embodiment which uses a different resolution of this conflict of code *23 does not depart from the spirit and scope of the present invention.

When there are a plurality of DPs which have the identical explicit DN and FP code(s), a particular DP among said plurality of DPs may be chosen by one or more of the following alternative methods: first, because a specific destination transaction indicator data element in the origination message specifies that particular DP; second, because the first matching DP is a busy destination and the aforementioned sequential hunting process finds another DP within said plurality of DPs by means of a sequential search in the SCP 800; third, because the first matching DP is a busy destination and the aforementioned sequential hunting process finds another DP within said plurality of DPs by means of a sequential search in the destination switch node (such as switch 600). The second aforementioned alternative requires that the busy or idle status of each line be communicated from the destination switch 600 to the SCP 800 by means of appropriate S7 messages, so that the SCP is continually aware of which such lines are busy or idle. The third aforementioned alternative permits a minor variation on the structure of the translation tables in the SCP 800. In this case, only one line entry is required in the FP translation table 815 to represent a plurality of DP lines in destination switch 600 or other destination switches (not shown) which have the identical explicit DN and the identical FP codes.

The one destination pseudo-number comprised in said one line entry of table 815 is the appropriate pseudo-number which will translate into one of the plurality of appropriate line appearances in said destination switch 600. Said line appearance can, in a first sub-alterative, be the so-called pilot line of a sequential hunt group, or in a second sub-alternative it can be any line appearance within the scope of a so-called circle hunt. This latter alternative with either of its two sub-alternatives reduces the complexity of the SCP software and modifies the message traffic activity in the network. Any or all of the alternative embodiments described in this paragraph are within the scope and spirit of the present invention.

Alternative Origination-Related FP Entry

Certain telephone lines are used for different origination purposed on different occasions. A further alternative preferred embodiment of the invention includes the following capabilities in addition to those already recited with regard to the prior preferred embodiment. The preferred embodiment of the following capabilities requires only the same types of entry and modification of the IAM and other S7 call processing messages which have been described, but at the time a call is made rather than in advance.

Consider a line used primarily for voice origination, but occasionally used for a fax origination instead. To facilitate such multiple uses of the same line, the originator may enter distinct FP code entries as a prefix to the explicit DN entry. Note that entry as a suffix or infix to the explicit DN, or other forms or combinations, may be used with, or instead of a prefix, particularly in non-North American numbering plans. Thus, the user would set the background FP code by lifting the handset for the first time on a newly installed telephone line, dialing for example *220044, and then hanging up. This sets both the origination and destination codes to be *220044. Alternatively the user could lift the handset for the first time and dial *293*220044, which sets the origination FP code to *220044 but does not set a destination code. The background origination FP code is now set for English language voice, and the user may originate all such calls by merely dialing the explicit 7 digit or 11 digit destination DN in the customary way (or longer digit strings for calls outside of North America, etc.).

On an occasion when the originator wishes to make a fax call to explicit DN 1 212 555 4321 from this same line, the dial on the fax machine would be used to dial the following: *23**1 212 555 4321, and then wait for the ringing and connection to the destination fax machine. This will have the normal result of temporarily replacing the background origination *220044 FP code by *23 for this call only. On subsequent calls where the explicit DN is dialed, the background *220044 FP code will be back in place.

Some users may have other FP codes in place which they desire to remain in place although certain other FP codes are changed for one call only. Consider an originator who has previously set the background origination codes *2233 and *255, indicating that the originator speaks the French language and wishes to reach a financial department. If this originator still wishes to reach a financial department, but wishes to make fax call rather than a voice call, there are several alternative ways to do this. Only one of the alternative methods will be described for the sake of brevity. First, this user must perform an entry which sets the mode of the system so that all non-compatible codes will be suspended when a per-call FP entry is made, but any codes which have no compatibility conflicts with the newly entered FP codes will be retained. This mode change is done by lifting the handset, and upon hearing dial tone, entering *205, and then hanging up. After doing this, when a call to a fax machine with explicit DN 1 212 555 4321 is desired, lift the handset and dial the following: *23**1 212 555 4321, and then wait for the ringing and connection to the destination fax machine. This will have the normal result of temporarily replacing the background origination *220044 FP code by *23 for this call only, but leaving the *255 code in place. In general, voice codes are incompatible with data modem codes, and likewise with fax codes although other cases exist as well. Departmental and family relationship codes are mostly fully compatible with the three categories of voice, data, and fax.

It is, of course, permissible to have in place both the *220044 English language voice FP code and also the *23 fax code as origination codes, but this will cause the actual call destination point to be governed by the FP codes in place at the destination, which may or may not achieve the result desired by the originator. When the originator specifically uses only non-incompatible origination FP code(s) on each originated call, a connection to the desired destination is more sure. Note that when a single line has both a voice telephone and a fax machine on it simultaneously, for convenience in receiving both types of calls, it is feasible to set both types of FP destination codes. The line will then ring for both voice calls (in English) and fax calls. In such a case, the fax machine should preferably have a loudspeaker installed to allow persons nearby to hear the beginning of each call so they can answer a voice call manually. When a long sequence of FP codes are needed to properly set the temporary status for a single call, and this particular sequence is used repeatedly, it may be "recorded" by the following sequence of entries: lift the handset, enter *208, then enter the sequence of FP codes to be recorded, then hang up. After this is done, the entire sequence of FP codes may be invoked as a prefix *2 proceeding a dialed DN, as in this example *2**4214 7654321. It is anticipated that a suitable machine can be used to enter such per-call FP codes as well as a number originator.

Alternative Destination-Related FP Entry

In addition to entry of the FP codes in advance of other activities, and in addition to entry at the time of call origination, a third alternative comprising entry near the time of answering a call is of significance, particularly during a transition calendar interval when only a portion of the network is fully equipped according to the teachings of the present invention. For various reasons, an incoming call may cause ringing of the "wrong" destination point telephone line. Upon answering the ringing, some audible status of the telephone channel may indicate or strongly suggest that the call is better handled by an alternative line. For example, a human user, upon answering a call, may hear any one of the following audible conditions indicating or suggesting various types of non-voice calls: first, a periodic beep indicating an originating fax machine; second, a substantially continuous modem tone or a hissing sound indicating a PCM modem; third, a silence or substantial silence with only normal line noises, possibly indicating a modem call wherein the originating modem is awaiting an audible tone from the answering modem.

In any case, the following capabilities constitute a further alternative means of entry of origination FP codes applicable to such calls. These capabilities involve the same data entry steps and the modification of some of the IAM message data fields previously described, together with a return of the modified IAM message to either the SCP or the origination switch as previously described in the case of crank back connections. Alternatively, if the destination related FP data base and process are accessible to the destination control processor (such as destination switch processor 610), the transfer of the connection can be done via call forwarding either within the same destination switch when the ultimate destination line is within that same destination switch, or via an outgoing trunk when the ultimate destination is in a distinct destination switch.

Upon answering a call which the destination user desires to transfer or re-direct to an alternate destination, said destination user must first do a so-called "flash" operation in a preferred embodiment using existing telephone switching technology. For an analog telephone line, this requires operating the cradle switch (also called a "switch hook") for a brief time, typically between 1 and 2 seconds. In an analog telephone, this disconnects the dc loop current for such a time interval. In an ISDN or a proprietary digital telephone, the user presses an appropriate push button, which produces a digital message to the control processor of the switching node, via the telephone line. In either case, the result is that the incoming call is placed on hold, and the answering user hears a "fresh" dial tone. At this point, the subscriber may enter the desired FP code(s) and then hang up the telephone. The result is that the incoming call is re-directed to an alternate line having the appropriate FP destination code, which new destination line then rings and possibly answers. The result is due to either a crank back or call forwarding switching operation with a modified IAM message now containing the newly entered FP codes with non-compatible FP codes removed, and otherwise as herein described.

For clarity, consider the example of a ringing voice line which is answered and reveals the periodic audible tone from an originating fax machine. The person who answers makes a cradle switch flash, and upon hearing the dial tone, dials *23, and then hangs up. Presuming that said voice line is a member of a group of lines with a shared explicit DN and said group contains at least one non-busy fax line, the call will transfer to said fax line. If not, the call will stay on hold at the voice line, and said voice line will continue to ring for a predetermined time until answered. It is anticipated that a suitable machine can be used to respond to audio frequency characteristics of an answered call and enter such FP codes as well as a destination user.

The present invention produces the previously described benefits and a superior implementation of several services which each exist in the prior network art using existing equipment and modest software modifications. These include Automatic Interrupt Service (AIS) and Local Number Portability (LNP) in telephone networks.

Preferred Embodiment in a Mail or Parcel System

An originator may address a message or a parcel to the XYZ Corporation without using a street address or city, or to a certain street address and city without naming an individual or department at that destination to receive the item. The functional property code can be used to indicate which department, division, or which technical compatibility is desired at the destination, and the proper symbolic network destination needed in the network for proper delivery can be produced from appropriate predetermined translation tables. For example, a repairable item may be sent to the XYZ Corporation, with the repair department specified by means of pre-printed indicia on the shipping label. No street or city is needed on this label. Translation tables in the network will select the closest repair location of the XYZ corporation.

A shipment or mailing addressed to a certain named organization, or to a specific address, and originating from the accounts receivable department of the shipper, can be automatically delivered to the accounts payable department at the proper geographical destination address as a result of the appropriate FP code. This occurs in the present invention because the accounts receivable department has set an origination FP code which causes the translation tables to select the accounts payable department at the destination. This destination FP code may be automatically entered into the network via electronic means, or by suitable indicia (such as bar code, alphanumeric characters, a distinctive color, or other sensible pattern) printed on the shipment label as a result of this FP code setup.

An item addressed to a non-accessable SA, such as a PO Box number, when carried by a parcel delivery service, can likewise be translated into an alternative deliverable SA.

The translation may occur at any one of a number of different places in the transportation network, including the origin sorting location, a transit sorting location, or the destination sorting location. The network then uses the result of said translation, an internally meaningful network destination address, to effect the routing through methods appropriate for each network.

A separate data communications network, such as but not limited to, the Internet, may be used to provide and support such translation tables and processes or other networks, such as telephone or mail or parcel delivery.

Preferred Embodiment in a Data Communications Network

In the Internet or an electronic mail network, the originator may use a standardized FP code together with some fragmentary name of the destination person or organization, and the appropriate data bases in the network will translate this into a valid symbolic address. For example, one could address e-mail to "[oldest child of] Ignatz W. Grimsby", where [oldest child of] is one example of an FP code in an alphabetic string form, suitable for a typewriter keyboard entry, and the appropriate predetermined translation tables will translate that into a valid e-mail address such as ed.grimsby@mailplace.com. Similarly, one can attempt to access a world wide web page without knowing in advance the proper web page uniform resource locator (URL) code. One might enter, for example, "[repair department of] Bigcorp" which the appropriate data translation tables would translate into "http://www.bigcorp-subsidiary-of-even-bigger-corp.com/adiministration/manufacturing/repair."

Preferred Embodiment in a Pipeline

In a transportation network in which fluid traffic is conveyed via a pipeline or the like, the control of routing is performed by means of sensors which detect properties of the fluid in the pipe, such as thermal conductivity, sound velocity in the fluid, or other physical or chemical properties. In addition, in some pipelines in the prior art, a solid object called a pipeline "pig" is inserted in the pipe as a separator between different lots of fluid which are sent sequentially along the same pipe, and this pig can be traced by radio, magnetic or other sensors.

Translation tables used in this case may be set up to respond to particular inherent content physical properties of the fluid traffic as well as identification signals provided by the PIG. The particular FP codes used in particular industries which use fluid networks would be established by agreements in the industry affected. FP codes for petrochemical industries would include such destination functional properties as different categories of chemical reactor or storage tank functions. Origination functional properties may be designed based on physical or chemical examination of the content of the traffic. For example, the amount of sulfur dioxide in natural gas affects its suitability for use as a general heating fuel (low sulfur) versus limited use only as a chemical feed stock for carbon black (in the case of sulfur-dioxide-bearing or "sour" gas). Appropriate translation tables can specify valve openings and closings to achieve the desired network routing fluid flows and destinations.

I claim:

1. A method for establishing a path between points in a network, the method comprising:

storing a first functional property code associated with a first point;

storing a first address and a second functional property code associated with a second point;

receiving the first address from the first point, the first address indicating a desire to establish a path between the first point and the second point;

determining if the first point is compatible with the second point based on the first functional property code and the second functional property code; and determining a second address associated with the second point if the first point is compatible with the second point, the second address comprising a pseudo-address.

2. The method of claim 1, further comprising establishing a path between the first point and the second point using the second address.

3. The method of claim 1, wherein the first functional property code is compatible with the second functional property code if the first functional property code matches the second functional property code.

4. The method of claim 1, wherein the first functional property code can be compatible with the second functional property code even if the first functional property code does not match the second functional property code.

5. The method of claim 1, wherein one of the first functional property code and the second functional property code, but not both, is a negated functional property code, and further comprising:

determining if the first functional property code is compatible with the second functional property code; and refusing to establish a path between the first point and the second point if the first functional property code is compatible with the second functional property code.

6. The method of claim 1, further comprising:

storing a third functional property code associated with a third point, the third point being associated with the first address;

determining if the first point is compatible with the third point based on the first functional property code and the third functional property code; and determining a third address associated with the third point if the first point is compatible with the third point, the third address not being the same as the second address.

7. The method of claim 6, further comprising establishing a path between the first point and the third point using the third address.

8. The method of claim 6, further comprising establishing a path between the first point and both the second point, using the second address, and the third point, using the third address.

9. The method of claim 6, further comprising establishing a path only between the first point and the third point using the third address, even though the first point is compatible with the second point.

10. The method of claim 6, further comprising:

sending a first signal to the second point using the second address, the first signal indicating that the first point wishes to establish a path to the second point;

determining whether the second point responds that it is ready to establish a path;

establishing a path between the first point and the second point if the second point responds that it is ready to establish a path;

sending a second signal to the third point using the third address if the second point does not respond that it is ready to establish a path, the second signal indicating that the first point wishes to establish a path to the third point;

determining whether the third point responds that it is ready to establish a path; and establishing a path between the first point and the third point if the third point responds that it is ready to establish a path.

11. The method of claim 6, further comprising:

sending a first signal to the second point using the second address, the first signal indicating that the first point wishes to establish a path to the second point;

sending a second signal to the third point using the third address, the second signal indicating that the first point wishes to establish a path to the third point;

determining whether the second point or the third point responds first that it is ready to establish a path; and establishing a path between the first point and whichever of the second point and the third point that responds first that it is ready to establish a path.

12. The method of claim 1, wherein the network comprises a telecommunication network.

13. The method of claim 1, wherein:

the first point and the second point comprise telephone network devices; and the first address comprises a dialable telephone number.

14. The method of claim 13, wherein the first functional property code indicates that the first point supports voice communication and the second functional property code indicates that the second point supports facsimile communication.

15. The method of claim 1, wherein the second address is not valid in the network addressing plan.

16. The method of claim 1, wherein the second address comprises non-decimal digits.

17. The method of claim 1, wherein the first functional property code and the second functional property code comprise language codes, organizational codes, or family relationship codes.

18. The method of claim 1, further comprising modifying at least the first functional property code using a graphical user interface.

19. The method of claim 1, further comprising:

determining whether the first address satisfies an error protection code; and refusing to establish a path between the first point and the second point if the first address satisfies the error protection code.

20. The method of claim 1, further comprising:

receiving an indication to establish a communication session from the first point;

receiving a new functional property code entered at the first point; and substituting the new functional property code for the first functional property code for the communication session.

21. The method of claim 1, further comprising:

receiving an indication to establish a communication session from the first point;

receiving a new functional property code entered at the first point; and combining the new functional property code with the first functional property code such that the first point has multiple associated functional property codes for the communication session.

22. The method of claim 1, further comprising:

storing a third functional property code associated with a third point, the third point being associated with the first address;

receiving a new functional property code entered at the second point during a communication session;

substituting the new functional property code for the first functional property code for the communication session;

determining if the first point is compatible with the third point based on the first functional property code and the third functional property code;

determining a third address associated with the third point if the first point is compatible-with the third point, the third address not being the same as the second address; and establishing a path between the first point and the third point using the third address.

23. The method of claim 1, further comprising:

storing a third functional property code associated with a third point, the third point being associated with the first address;

receiving a new functional property code entered at the second point during a communication session;

combining the new functional property code with the first functional property code such that the first point has multiple associated functional property codes for the communication session;

determining if the first point is compatible with the third point based on the multiple functional property codes associated with the first point and the third functional property code;

determining a third address associated with the third point if the first point is compatible with the third point, the third address not being the same as the second address; and establishing a path between the first point and the third point using the third address.

24. The method of claim 1, wherein the second point has a plurality of second functional property codes.

25. The method of claim 24, wherein the second functional property codes comprise an origination functional property code and a destination functional property code.

26. The method of claim 25, wherein determining if the first point is compatible with the second point comprises determining whether the first functional property code is compatible with the destination functional property code.

27. The method of claim 25, wherein the origination functional property code and the destination functional property code of the second point are not identical.

28. A network for establishing a path between points, the network comprising:

a first point having an associated first functional property code;

a second point operable to be coupled to the first point, the second point having an associated first address and second functional property code; and a computer coupled to the first point, the computer comprising:

a memory operable to store the first functional property code, the second functional property code, and the first address; and a processor coupled to the memory, the processor operable to receive the first address entered at the first point as an indication to establish a path between the first point and the second point, to determine if the first point is compatible with the second point based on the first functional property code and the second functional property code, and to determine a second address associated with the second point if the first point is compatible with the second point, the second address comprising a pseudo-address.

29. The network of claim 28, wherein the processor is further operable to initiate the establishment of a path between the first point and the second point using the second address.

30. The network of claim 28, wherein the first functional property code is compatible with the second functional property code if the first functional property code matches the second functional property code.

31. The network of claim 28, wherein the first functional property code can be compatible with the second functional property code even if the first functional property code does not match the second functional property code.

32. The network of claim 28, wherein one of the first functional property code and the second functional property code, but not both, is a negated functional property code, and the computer is further operable to:
    determine if the first functional property code is compatible with the second functional property code; and
    refuse to establish a path between the first point and the second point if the first functional property code is compatible with the second functional property code.

33. The network of claim 28, further comprising a switch coupled to the first point, the second point, and the computer, the switch operable to establish a path between the first point and the second point using the second address.

34. The network of claim 28, further comprising a third point operable to be coupled to the first point, the third point associated with the first address and having an associated third functional property code, and wherein the computer is further operable to:
    store the third functional property code;
    determine if the first point is compatible with the third point based on the first functional property code and the third functional property code; and
    determine a third address associated with the third point if the first point is compatible with the third point, the third address not being the same as the second address.

35. The network of claim 34, wherein the processor is further operable to initiate the establishment of a path between the first point and the third point using the third address.

36. The network of claim 34, wherein the computer is further operable to initiate the establishment of a path between the first point and both the second point, using the second address, and the third point, using the third address.

37. The network of claim 34, wherein the computer is further operable to initiate the establishment of a path only between the first point and the third point using the third address, even though the first point is compatible with the second point.

38. The network of claim 34, wherein the computer is further operable to:
    send a first signal to the second point using the second address, the first signal indicating that the first point wishes to establish a path to the second point;
    determine whether the second point responds that it is ready to establish a path;
    initiate the establishment of a path between the first point and the second point if the second point responds that it is ready to establish a path;
    send a second signal to the third point using the third address if the second point does not respond that it is ready to establish a path, the second signal indicating that the first point wishes to establish a path to the third point;
    determine whether the third point responds that it is ready to establish a path; and
    initiate the establishment of a path between the first point and the third point if the third point responds that it is ready to establish a path.

39. The network of claim 34, wherein the computer is further operable to:
    send a first signal the second point using the second address, the first signal indicating that the first point wishes to establish a path to the second point;
    send a second signal to the third point using the third address, the second signal indicating that the first point wishes to establish a path to the third point;
    determine whether the second point or the third point responds first that it is ready to establish a path; and
    initiate the establishment of a path between the first point and whichever of the second point and the third point that responds first that it is ready to establish a path.

40. The network of claim 28, wherein the network comprises a telecommunication network.

41. The network of claim 28, wherein:
    the first point and the second point comprise telephone network devices; and
    the first address comprises a dialable telephone number.

42. The network of claim 41, wherein the first functional property code indicates that the first point supports voice communication and the second functional property code indicates that the second point supports facsimile communication.

43. The network of claim 28, wherein the second address is not valid in the network addressing plan.

44. The network of claim 28, wherein the second address comprises non-decimal digits.

45. The network of claim 28, wherein the first functional property code and the second functional property code comprise language codes, departmental activity codes, or family relationship codes.

46. The network of claim 28, further comprising a graphical user interface coupled to the computer so that a user may modify at least the first functional property code.

47. The network of claim 28, wherein the computer is further operable to:
    determine whether the first address satisfies an error protection code; and
    refuse to establish a path between the first point and the second point if the first address satisfies the error protection code.

48. The network of claim 28, wherein:
    the first point is coupled to a first central office;
    the second point is coupled to a second central office; and
    the computer is located at a service control point.

49. The network of claim 28, wherein the computer is further operable to:
    receive an indication to establish a communication session from the first point;
    receive a new functional property code entered at the first point; and substitute the new functional property code for the first functional property code for the communication session.

50. The network of claim 28, wherein the computer is further operable to:
   receive an indication to establish a communication session from the first point;
   receive a new functional property code entered at the first point; and
   combine the new functional property code with the first functional property code such that the first point has multiple associated functional property codes for the communication session.

51. The network of claim 28, further comprising a third point operable to be coupled to the first point, the third point associated with the first address and having an associated third functional property code, and wherein the computer is further operable to:
   store the third functional property code;
   receive a new functional property code entered at the second point during a communication session;
   substitute the new functional property code for the first functional property code for the communication session;
   determine if the first point is compatible with the third point based on the first functional property code and the third functional property code;
   determine a third address associated with the third point if the first point is compatible with the third point, the third address not being the same as the second address; and
   initiate the establishment of a path between the first point and the third point using the third address.

52. The network of claim 28, further comprising a third point operable to be coupled to the first point, the third point associated with the first address and having an associated third functional property code, and wherein the computer is further operable to:
   store the third functional property code;
   receive a new functional property code entered at the second point during a communication session;
   combine the new functional property code with the first functional property code such that the first point has multiple associated functional property codes for the communication session;
   determine if the first point is compatible with the third point based on the multiple functional property codes associated with the first point and the third functional property code;
   determine a third address associated with the third point if the first point is compatible with the third point, the third address not being the same as the second address; and
   initiate the establishment of a path between the first point and the third point using the third address.

53. The network of claim 28, wherein the second point has a plurality of associated second functional property codes.

54. The network of claim 53, wherein the second functional property codes comprise an origination functional property code and a destination functional property code.

55. The network of claim 54, wherein the processor determines if the first functional property code is compatible with the destination functional property code to determine if the first point is compatible with the second point.

56. The network of claim 54, wherein the origination functional property code and the destination functional property code of the second point are not identical.

57. A method for establishing a path between points in a network, the method comprising:
   storing a first functional property code associated with a first point;
   storing a first address and at least two second functional property codes associated with a second point;
   receiving the first address from the first point, the first address indicating a desire to establish a path between the first point and the second point; and
   determining if the first point is compatible with the second point based on the first functional property code and the second functional property codes.

58. The method of claim 57, further comprising establishing a path between the first point and the second point if the first point is compatible with the second point.

59. The method of claim 57, wherein the first functional property code is compatible with the second functional property codes if the first functional property code matches at least one of the second functional property codes.

60. The method of claim 57, wherein the first functional property code can be compatible with the second functional property codes even if the first functional property code does not match any of the second functional property codes.

61. The method of claim 57, wherein one of the first functional property code and the second functional property codes, but not the others, is a negated functional property code, and further comprising:
   determining if the first functional property code is compatible with one of the second functional property codes; and
   refusing to establish a path between the first point and the second point if either the first functional property code or the compatible second functional property code is the negated functional property code.

62. The method of claim 57, further comprising:
   receiving an indication to establish a communication session from the first point;
   receiving a new functional property code entered at the first point; and
   substituting the new functional property code for the first functional property code for the communication session.

63. The method of claim 57, further comprising:
   receiving an indication to establish a communication session from the first point;
   receiving a new functional property code entered at the first point; and
   using the new functional property code in combination with the first functional property code such that the first point has multiple associated functional property codes for the communication session.

64. The method of claim 57, further comprising:
   storing at least two third functional property codes associated with a third point, the third point being associated with the first address;
   receiving a new functional property code entered at the second point during a communication session;
   substituting the new functional property code for the first functional property code for the communication session;
   determining if the first point is compatible with the third point based on the first functional property code and the third functional property code; and establishing a path between the first point and the third point if the first point is compatible with the third point.

65. The method of claim 57, further comprising:
storing at least two third functional property codes associated with a third point, the third point being associated with the first address;
receiving a new functional property code entered at the second point during a communication session;
combining the new functional property code with the first functional property code such that the first point has multiple associated functional property codes for the communication session;
determining if the first point is compatible with the third point based on multiple functional property codes associated with the first point and the third functional property codes; and
establishing a path between the first point and the third point if the first point is compatible with the third point.

66. The method of claim 57, wherein one of the second functional property codes comprises a language code, an organizational code, or a family relationship code.

67. The method of claim 57, wherein the second functional property codes comprise an origination functional property code and a destination functional property code.

68. The method of claim 67, wherein determining if the first point is compatible with the second point comprises determining whether the first functional property code is compatible with the destination functional property code.

69. The method of claim 67, wherein the origination functional property code and the destination functional property code of the second point are not identical.

70. The method of claim 57, wherein:
the first point has at least two first functional property codes; and
the step of determining if the first point is compatible with the second point comprises determining if the first functional property codes are compatible with the second functional property codes.

71. The method of claim 70, wherein the first functional property codes are compatible with the second functional property codes if at least one of the first functional property codes matches at least one of the second functional property codes.

72. The method of claim 70, wherein at least one of the first functional property codes comprises a language code, a departmental activity code, or a family relationship code.

73. The method of claim 70, wherein:
the first functional property codes comprise a first origination functional property code and a first destination functional property code;
the second functional property codes comprise a second origination functional property code and a second destination functional property code; and
the step of determining if the first point is compatible with the second point comprises comparing the first origination functional property code to the second destination functional property code.

74. The method of claim 73, wherein the first origination functional property code and the first destination functional property code of the first point are not identical.

75. The method of claim 57, further comprising:
storing at least two third functional property codes associated with a third point, the third point being associated with the first address; and
determining if the first point is compatible with the third point based on the first functional property code and the third functional property codes.

76. The method of claim 75, further comprising establishing a path between the first point and the third point if the first point is compatible with the third point.

77. The method of claim 75, further comprising establishing a path between the first point and both the second point and the third point if the first point is compatible with both the second point and the third point.

78. The method of claim 75, further comprising establishing a path only between the first point and the third point if the first point is compatible with the third point, even though the first point is compatible with the second point.

79. The method of claim 75, further comprising:
sending a first signal to the second point if the second point is compatible with the first point, the first signal indicating that the first point wishes to establish a path to the second point;
determining whether the second point responds that it is ready to establish a path;
establishing a path between the first point and the second point if the second point responds that it is ready to establish a path;
sending a second signal to the third point if the third point is compatible with the first point and if the second point does not respond that it is ready to establish a path, the second signal indicating that the first point wishes to establish a path to the third point;
determining whether the third point responds that it is ready to establish a path; and
establishing a path between the first point and the third point if the third point responds that it is ready to establish a path.

80. The method of claim 75, further comprising:
sending a first signal to the second point if the second point is compatible with the first point, the first signal indicating that the first point wishes to establish a path to the second point;
sending a second signal to the third point if the third point is compatible with the first point, the second signal indicating that the first point wishes to establish a path to the third point;
determining whether the second point or the third point responds first that it is ready to establish a path; and
establishing a path between the first point and whichever of the second point and the third point that responds first that it is ready to establish a path.

81. The method of claim 57, wherein the network comprises a telecommunication network.

82. The method of claim 57, wherein the first point and the second point comprise telephone network devices and the first address comprises a telephone number.

83. The method of claim 82, wherein the first functional property code indicates that the first point supports voice communication and one of the second functional property codes indicates that the second point supports facsimile communication.

84. The method of claim 57, further comprising modifying at least the first functional property code using a graphical user interface.

85. The method of claim 57, further comprising:
determining whether the first address satisfies an error protection code; and
refusing to establish a path between the first point and the second point if the first address satisfies the error protection code.

86. A network for establishing a path between points, the network comprising:

a first point having an associated first functional property code;

a second point operable to be coupled to the first point, the second point having an associated first address and at least two second functional property codes; and a computer coupled to the first point, the computer comprising:

a memory operable to store the first functional property code, the second functional property codes, and the first address; and a processor coupled to the memory, the processor operable to receive the first address from the first point as an indication to establish a path between the first point and the second point and to determine if the first point is compatible with the second point based on the first functional property code and the second functional property codes.

87. The network of claim 86, wherein the computer is further operable to initiate the establishment of a path between the first point and the second point if the first point is compatible with the second point.

88. The network of claim 86, wherein the first functional property code is compatible with the second functional property codes if the first functional property code matches at least one of the second functional property codes.

89. The network of claim 86, wherein the first functional property code can be compatible with the second functional property codes even if the first functional property code does not match any of the second functional property codes.

90. The network of claim 86, wherein one of the first functional property code and the second functional property codes, but not the others, is a negated functional property code, and the computer is further operable to:

determine if the first functional property code is compatible with one of the second functional property codes; and refuse to establish a path between the first point and the second point if either the first functional property code or the compatible second functional property code is the negated functional property code.

91. The network of claim 86, wherein the computer is further operable to:

receive an indication to establish a communication session from the first point;

receive a new functional property code entered at the first point; and substitute the new functional property code for the first functional property code for the communication session.

92. The network of claim 86, wherein the computer is further operable to:

receive an indication to establish a communication session from the first point;

receive a new functional property code entered at the first point; and use the new functional property code in combination with the first functional property code such that the first point has multiple associated functional property codes for the communication session.

93. The network of claim 86, further comprising a third point operable to be coupled to the first point, the third point associated with the first address and having at least two associated third functional property codes, and wherein the computer is further operable to:

store the third functional property codes;

receive a new functional property code entered at the second point during a communication session;

substitute the new functional property code for the first functional property code for the communication session;

determine if the first point is compatible with the third point based on the first functional property code and the third functional property codes; and initiate the establishment of a path between the first point and the third point if the first point is compatible with the third point.

94. The network of claim 86, further comprising a third point operable to be coupled to the first point, the third point associated with the first address and having at least two associated third functional property codes, and wherein the computer is further operable to:

store the third functional property codes;

receive a new functional property code entered at the second point during a communication session;

combine the new functional property code with the first functional property code such that the first point has multiple associated functional property codes for the communication session;

determine if the first point is compatible with the third point based on the multiple functional property codes associated with the first point and the third functional property codes; and initiate the establishment of a path between the first point and the third point if the first point is compatible with the third point.

95. The network of claim 86, wherein at least one of the second functional property codes is a language code, an organizational code, or a family relationship code.

96. The network of claim 86, wherein at least one of the second functional property codes comprises an origination functional property code and a destination functional property code.

97. The network of claim 96, wherein the processor determines if the first functional property code is compatible with the destination functional property code to determine if the first point is compatible with the second point.

98. The network of claim 96, wherein the origination functional property code and the destination functional property code are not identical.

99. The network of claim 86, wherein the first point has at least two associated first functional property codes and the computer is further operable to determine if the first functional property codes are compatible with the second functional property codes.

100. The network of claim 99, wherein the first functional property codes are compatible with the second functional property codes if at least one of the first functional property codes matches at least one of the second functional property codes.

101. The network of claim 99, wherein at least one of the first functional property codes comprises a language code, a departmental activity code, or a family relationship code.

102. The network of claim 99, wherein:

the first functional property codes comprise a first origination functional property code and a first destination functional property code;

the second functional property codes comprise a second origination functional property code and a second destination functional property code; and the processor determines if the first origination functional property code is compatible with the second destination functional property code to determine if the first point is compatible with the second point.

103. The network of claim 102, wherein the first origination functional property code and the first destination functional property code of the first point are not identical.

104. The network of claim 86, further comprising a third point operable to be coupled to the first point, the third point associated with the first address and having at least two associated third functional property codes, and wherein the computer is further operable to:
store the third functional property codes; and
determine if the first point is compatible with the third point based on the first functional property code and the third functional property codes.

105. The network of claim 104, wherein the processor is further operable to initiate the establishment of a path between the first point and the third point if the first point is compatible with the third point.

106. The network of claim 104, wherein the processor is further operable to initiate the establishment of a path between the first point and both the second point and the third point if the first point is compatible with both the second point and the third point.

107. The network of claim 104, wherein the processor is further operable to initiate the establishment of a path only between the first point and the third point if the first point is compatible with the third point, even though the first point is compatible with the second point.

108. The network of claim 104, wherein the processor is further operable to:
send a first signal to the second point if the second point is compatible with the first point, the first signal indicating that the first point wishes to establish a path to the second point;
determine whether the second point responds that it is ready to establish a path;
initiate the establishment of a path between the first point and the second point if the second point responds that it is ready to establish a path;
send a second signal to the third point if the third point is compatible with the first point and if the second point does not respond that it is ready to establish a path, the second signal indicating that the first point wishes to establish a path to the third point;
determine whether the third point responds that it is ready to establish a path; and
establish a path between the first point and the third point if the third point responds that it is ready to establish a path.

109. The network of claim 104, wherein the processor is further operable to:
send a first signal to the second point if the second point is compatible with the first point, the first signal indicating that the first point wishes to establish a path to the second point;
send a second signal to the third point if the third point is compatible with the first point, the second signal indicating that the first point wishes to establish a path to the third point;
determine whether the second point or the third point responds first that it is ready to establish a path; and
establish a path between the first point and whichever of the second point and the third point that responds first that it is ready to establish a path.

110. The network of claim 86, wherein the network comprises a telecommunication network.

111. The network of claim 86, wherein the memory comprises random access memory and registers.

112. The network of claim 86, wherein the first point and the second point comprise telephone network devices and the first address comprises a telephone number.

113. The network of claim 112, wherein the first functional property code indicates that the first point supports voice communication and one of the second functional property codes indicates that the second point supports facsimile communication.

114. The network of claim 86, further comprising a graphical user interface coupled to the computer so that a user may modify at least the first functional property code.

115. The network of claim 86, wherein:
the first point is coupled to a first central office;
the second point is coupled to a second central office; and
the computer is located at a service control point.

116. The network of claim 86, wherein the computer is further operable to:
determine whether the first address satisfies an error protection code; and
refuse to establish a path between the first point and the second point if the first address satisfies the error protection code.

117. A method for programming and using a functional property code for a communication device, the method comprising:
receiving in a programming session at a communication device a functional property code;
communicating the functional property code to a storage location for storage;
terminating the programming session; and
initiating a communication session in accordance with the functional property code.

118. The method of claim 117, wherein initiating a communication session in accordance with the functional property code comprises:
receiving a first address associated with a second communication device; and
communicating the first address to the storage location.

119. The method of claim 117, wherein initiating a communication session comprises:
receiving a new functional property code to substitute for the stored functional property code for the communication session; and
communicating the new functional property code to the storage location.

120. The method of claim 117, wherein initiating a communication session comprises:
receiving a new functional property code to be used in combination with the stored functional property code such that the communication device has multiple associated functional property codes for the communication session; and
communicating the new functional property code to the storage location.

121. The method of claim 117, wherein the communication device has a plurality of functional property codes stored at the storage location.

122. The method of claim 121, wherein the functional property codes comprise an origination functional property code and a destination functional property code, the origination functional property code for use in initiating communications from the communication device and the destination functional property code for use in receiving communications at the communication device.

123. The method of claim 122, wherein the origination functional property code and the destination functional property code are not identical.

124. The method of claim 122, wherein:
the origination functional property code indicates a type of department to be reached in an organization; and
the destination functional property code indicates a type of department associated with the communication device.

125. The method of claim 117, wherein the storage location is part of a telecommunication network.

126. The method of claim 117, wherein the functional property code comprises a language code, an organizational code, or a family relationship code.

127. The method of claim 117, wherein the communication device comprises a telephone network device.

128. The method of claim 117, further comprising modifying at least the first functional property code using a graphical user interface.

* * * * *